(12) United States Patent
Dou et al.

(10) Patent No.: US 11,805,559 B2
(45) Date of Patent: *Oct. 31, 2023

(54) SESSION MANAGEMENT METHOD AND SYSTEM, AND TERMINAL FOR LOCATING A USER PLANE FUNCTION (UPF) ENTITY WHEN A SESSION IS AN INACTIVE STATE

(71) Applicant: Huawei Technologies Co., Ltd., Shenzhen (CN)

(72) Inventors: Fenghui Dou, Beijing (CN); Yue He, Shenzhen (CN); Hui Jin, Beijing (CN); Guowei Ouyang, Beijing (CN); Haorui Yang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/527,914

(22) Filed: Nov. 16, 2021

(65) Prior Publication Data
US 2022/0150994 A1 May 12, 2022

Related U.S. Application Data

(63) Continuation of application No. 16/612,086, filed as application No. PCT/CN2017/083667 on May 9, 2017, now Pat. No. 11,206,700.

(51) Int. Cl.
*H04W 76/12* (2018.01)
*H04W 76/11* (2018.01)
(Continued)

(52) U.S. Cl.
CPC ........ *H04W 76/12* (2018.02); *H04W 36/0011* (2013.01); *H04W 36/14* (2013.01);
(Continued)

(58) Field of Classification Search
CPC . H04W 36/011; H04W 36/14; H04W 60/005; H04W 64/003; H04W 76/11;
(Continued)

(56) References Cited

U.S. PATENT DOCUMENTS

2007/0147315 A1  6/2007  Khoury et al.
2011/0026518 A1  2/2011  Jin et al.
(Continued)

FOREIGN PATENT DOCUMENTS

CN  1860737 A  11/2006
CN  101848512 A  9/2010
(Continued)

OTHER PUBLICATIONS

3GPP "3rd Generation Partnership project Technical Specification Group Services and system Aspects Procedures for the 5G System" (Year: 2017).*
(Continued)

*Primary Examiner* — Mewale A Ambaye
(74) *Attorney, Agent, or Firm* — Conley Rose, P.C.

(57) ABSTRACT

Embodiments of the present application relate to the field of communications technologies, and provide a session management method and system, and a terminal. The method includes: when user equipment UE has a first protocol data unit PDU session, sending, by the UE, a service request message to an access and mobility management function AMF entity; receiving, by the UE, a first message sent by the AMF entity; and determining, by the UE based on the first message, to re-establish or modify the first PDU session. In the embodiments of the present invention, the UE sends the service request message to the AMF entity, and then the AMF entity sends, to the UE, the first message used to determine to re-establish or modify the first PDU session.

32 Claims, 29 Drawing Sheets

(51) Int. Cl.
   *H04W 36/00* (2009.01)
   *H04W 36/14* (2009.01)
   *H04W 60/00* (2009.01)
   *H04W 64/00* (2009.01)
   *H04W 80/10* (2009.01)

(52) U.S. Cl.
   CPC ....... *H04W 60/005* (2013.01); *H04W 64/003* (2013.01); *H04W 76/11* (2018.02); *H04W 80/10* (2013.01)

(58) Field of Classification Search
   CPC ..... H04W 76/12; H04W 76/19; H04W 76/22; H04W 76/32; H04W 80/10
   See application file for complete search history.

(56) References Cited

U.S. PATENT DOCUMENTS

| | | | |
|---|---|---|---|
| 2012/0051289 | A1 | 3/2012 | Dwyer et al. |
| 2016/0006842 | A1 | 1/2016 | Tahir |
| 2016/0095036 | A1 | 3/2016 | Stojanovski et al. |
| 2018/0270715 | A1 | 9/2018 | Lee et al. |
| 2018/0279397 | A1* | 9/2018 | Faccin ................. H04W 76/11 |
| 2019/0075590 | A1 | 3/2019 | Andersson et al. |
| 2019/0116521 | A1* | 4/2019 | Qiao ..................... H04W 28/06 |
| 2019/0254089 | A1 | 8/2019 | Huang-Fu et al. |
| 2019/0261449 | A1 | 8/2019 | Kim et al. |
| 2019/0306867 | A1* | 10/2019 | Cirik ................. H04W 74/0833 |
| 2019/0313468 | A1* | 10/2019 | Talebi Fard .......... H04W 76/12 |
| 2019/0357238 | A1* | 11/2019 | Zhou ..................... H04W 72/23 |
| 2020/0314731 | A1 | 10/2020 | Ryu et al. |
| 2021/0051761 | A1 | 2/2021 | Kahn et al. |

FOREIGN PATENT DOCUMENTS

| | | | |
|---|---|---|---|
| CN | 101931542 | A | 12/2010 |
| CN | 102754517 | A | 10/2012 |
| CN | 102833042 | A | 12/2012 |
| CN | 103888219 | A | 6/2014 |
| CN | 105103599 | A | 11/2015 |
| CN | 106576228 | A | 4/2017 |
| GB | 2552845 | A | 2/2018 |
| WO | WO-2016048573 | A1 * | 3/2016 ........ H04W 36/0033 |

OTHER PUBLICATIONS

S2-171750, Ericsson,"23.501: UPF and SMF Service Areas," SA WG2 Meeting #120, Mar. 27-31, 2017, Busan, Korea, 8 pages.
"5G System Architecture Progress in 3GPP SA2," Feb. 18, 2017, 3BF-170010, 10 pages.
3GPP TS 23.501 V0.4.0, (Apr. 2017), "3rd Generation Partnership Project; Technical Specification Group Services and System Aspects; System Architecture for the 5G System; Stage 2 (Release 15)," 124 pages.
Samsung, "Baseline description for Network Function selection," S2-170258, SA WG2 Meeting #118bis, Jan. 16-20, 2017, Spokane. USA, 4 pages.
Nokia, et al., "Overall architecture proposal," S2-170570, SA WG2 Meeting #118bis, Jan. 16-20, 2017, Spokane, WA, USA, 12 pages.
S2-172081, LG Electronics, "TS 23.501: SSC mode 2 and PDU session anchor service area," SA WG2 Meeting #120, Mar. 27-31, 2017, Busan, South Korea, 4 pages.
S2-174072, Huawei, "TS 23.502: UPF relocation procedure when UE in CM-IDLE," SA WG2 Meeting #121, May 15-19, 2017, Hangzhou, China, 5 pages.
Qualcomm Incorporated, "23.501—AMF-SMF implications of optimal UPF placement," S2-171714, SAWG2 Meeting #S2-120, Mar. 27-31, 2017, Busan, South Korea, 6 pages.
"3rd Generation Partnership Project; Technical Specification Group Services and System Aspects; Procedures for the 5G System; Stage 2 (Release 15)," 3GPP TS 23.502, V0.2.0, Feb. 2017, 71 pages.
"3rd Generation Partnership Project; Technical Specification Group Services and System Aspects; Procedures for the 5G System; Stage 2 (Release 15)," 3GPP TS 23.502, V0.3.0, Mar. 2017, 115 pages.
S2-171107, ETRI, "TS 23.502: P-CR to add the procedures for TUPF relocation to support SSC," SA WG2 Meeting #119, Feb. 13-17, 2017, Dubrovnik, Croatia, 3 pages.
S2-171871, Huawei, "TS 23.501: Service area of CN NF," 3GPP TSG SA WG2 Meeting #120, Mar. 27-31, 2017, Busan, Korean, 4 pages.

* cited by examiner

SESSION MANAGEMENT METHOD AND SYSTEM, AND TERMINAL FOR LOCATING A USER PLANE FUNCTION (UPF) ENTITY WHEN A SESSION IS AN INACTIVE STATE

CROSS-REFERENCE TO RELATED APPLICATIONS

This application is a continuation of U.S. patent application Ser. No. 16/612,086 filed on Nov. 8, 2019, which is a National Stage of International Patent Application No. PCT/CN2017/083667 filed on May 9, 2017, both of which are incorporated herein by reference in their entireties.

TECHNICAL FIELD

Embodiments of the present invention relate to the field of communications technologies, and in particular, to a session management method and system, and a terminal.

BACKGROUND

In the 5th-generation mobile communication technology (5-Generation, 5G), a PDU session (session) used to provide a protocol data unit (Protocol Data Unit, PDU) connection service exists between user equipment (User Equipment, UE) and a data network (Date Network, DN). Session and service continuity modes that are usually used for the PDU session are a session and service continuity mode (Session and Service Continuity mode, SSC mode) 1 and an SSC mode 2.

As shown in FIG. 1, FIG. 1 shows a procedure for establishing a session of an SSC mode 1. To be specific, UE sends a first message used to instruct to establish a session; after selecting a session management function (Session Management Function, SMF) entity based on the first message, an access and mobility management function (Authentication and Mobility Management Function, AMF) entity sends the first message to the selected SMF entity; and then, when the SMF entity receives the first message sent by the UE, the SMF entity selects a new user plane function (User Plan Function, UPF) entity, to establish a first PDU session between the user equipment and the SMF entity.

In a conventional technical solution, as shown in FIG. 2, FIG. 2 is a schematic flowchart of UPF entity relocation when a session of an SSC mode 1 is in an active state. In FIG. 2, an SMF entity determines that there is a need to change again a UPF entity with which UE establishes a session. In this case, the SMF entity sends a second message to the UE by using an AMF entity. The second message is used to instruct the UE to re-establish a PDU session that has a same data network (Data Network, DN) as the session. Then, the SMF entity releases a first PDU session, and when receiving a request that is sent by the UE and that is used to establish a second session, the SMF entity establishes a second session with the user equipment by using a first UPF entity.

However, the conventional technical solution is applicable to only a procedure in which when a session mode is in an active state, an SMF entity determines that there is a need to change again a UPF entity with which UE establishes a session. If the session is in an inactive state (for example, the UE is in an idle state, or the UE is in a connected state but the session is in an inactive state), a procedure of how to change again a UPF entity with which the UE establishes a session is not clear.

SUMMARY

This application provides a session management method and system, and a terminal, so as to resolve a prior-art problem of how to relocate a UPF entity when a session is in an inactive state.

To achieve the foregoing objective, this application uses the following technical solutions.

According to a first aspect, an embodiment of the present invention provides a session management method, where user equipment UE has a first protocol data unit PDU session, and the method provided in this embodiment of the present invention includes: sending, by the UE, a service request message to an access and mobility management function AMF entity; receiving, by the UE, a first message sent by the AMF entity; and re-establishing or modifying, by the UE, the first PDU session based on the first message.

In the session management method provided in this embodiment of the present invention, the UE sends the service request message to the AMF entity, and then the AMF entity sends, to the UE, the first message used to determine to re-establish the first PDU session. In this case, when it is determined that the first PDU session needs to be activated or that the UE moves out of an area corresponding to the first PDU session, it may be ensured that before data needs to be transmitted or received, the first PDU session is re-established in time to generate a second PDU session, so as to ensure that data is not lost.

With reference to the first aspect, in a first possible implementation of the first aspect, the first message is a service accept message, the service accept message carries an identifier of the first PDU session and a first indication, the identifier is used to identify the first PDU session, and the first indication is used to instruct to re-establish or modify a PDU session. The UE directly determines, with reference to specific content of the first indication, to re-establish or modify the first PDU session, so that after receiving the indication used to instruct to re-establish the first PDU session, the UE directly sends a second message used to re-establish the first PDU session; or after receiving the indication used by a user to instruct to modify the first PDU session, the UE directly sends a second message used to modify the first PDU session.

With reference to the first aspect or the first possible implementation of the first aspect, in a second possible implementation of the first aspect, the re-establishing or modifying, by the UE, the first PDU session based on the first message includes: if the first indication is used to instruct the UE to re-establish the first PDU session, re-establishing, by the UE, the first PDU session based on the identifier and the first indication.

With reference to any one of the first aspect to the second possible implementation of the first aspect, in a third possible implementation of the first aspect, the re-establishing or modifying, by the UE, the first PDU session based on the first message includes: if the first indication is used to instruct the UE to modify the first PDU session, modifying, by the UE, the first PDU session based on the identifier and the first indication.

With reference to any one of the first aspect to the third possible implementation of the first aspect, in a fourth possible implementation of the first aspect, the first message is a service reject message, the service reject message carries an identifier of the first PDU session and a cause value, the identifier is used to identify the first PDU session, and the cause value indicates that the UE moves out of an area corresponding to a PDU session. In this way, after receiving the first message, the AMF entity may determine, based on the cause value, that the UE moves out of an area corresponding to the first PDU session associated with the identifier, so as to trigger the AMF entity to perform UPF entity relocation or trigger an SMF entity to perform UPF entity relocation.

With reference to any one of the first aspect to the fourth possible implementation of the first aspect, in a fifth possible implementation of the first aspect, the re-establishing, by the UE, the first PDU session based on the first message includes: determining, by the UE based on the identifier and the cause value, to re-establish or modify the first PDU session.

With reference to any one of the first aspect to the fifth possible implementation of the first aspect, in a sixth possible implementation of the first aspect, after the re-establishing or modifying, by the UE, the first PDU session based on the first message, the method further includes: sending, by the UE to the AMF entity, a second message used to request to re-establish or modify the first PDU session. After determining to re-establish or modify the first PDU session, the UE triggers the second message used to re-establish or modify the first PDU session, so as to ensure that the second PDU session is in an active state before data is sent.

According to a second aspect, an embodiment of the present invention provides a session management method, where user equipment UE has a first protocol data unit PDU session, and the method provided in this embodiment of the present invention includes: receiving, by an SMF entity, a first message that is sent by an access and mobility management function AMF entity and that is used to instruct the SMF entity to determine whether the UE moves out of an area corresponding to the first PDU session; determining, by the SMF entity based on the first message, that the UE moves out of a service area of a user plane function UPF entity corresponding to the first PDU session; and sending, by the SMF entity, a first parameter to the UE by using the AMF entity, where the first parameter is used to instruct the UE to re-establish or modify the first PDU session.

With reference to the second aspect, in a first possible implementation of the second aspect, the first parameter includes an identifier of the first PDU session and a first indication, the identifier is used to identify the first PDU session, and the first indication is used to instruct the UE to send a request used to re-establish or modify the first PDU session associated with the identifier.

With reference to the second aspect or the first possible implementation of the second aspect, in a second possible implementation of the second aspect, before the receiving, by an SMF entity, a first message sent by an access and mobility management function AMF entity, the method provided in this embodiment of the present invention further includes: sending, by the SMF entity to the AMF entity, the area corresponding to the first PDU session; or sending, by the SMF entity to the AMF entity, an identifier of the user plane function UPF entity corresponding to the first PDU session, where the identifier of the UPF entity is used by the AMF entity to determine the area corresponding to the first PDU session.

With reference to any one of the second aspect to the second possible implementation of the second aspect, in a third possible implementation of the second aspect, the first message carries location information of the UE, or the first message carries a second indication used to indicate that the UE moves out of the area corresponding to the first PDU session.

With reference to any one of the second aspect to the third possible implementation of the second aspect, in a fourth possible implementation of the second aspect, when the SMF entity determines, based on the first message, that a location of the UE is outside the area corresponding to the first PDU session, the sending, by the SMF entity, a first parameter to the UE by using the AMF entity further includes: determining, by the SMF entity, a session continuity mode of the first PDU session; and when the SMF entity determines that the session continuity mode of the first PDU session is a first session mode or a second session mode, sending, by the SMF entity, the first parameter to the UE by using the AMF entity.

According to a third aspect, an embodiment of the present invention provides a session management method, where user equipment UE has a first protocol data unit PDU session, and the method provided in this embodiment of the present invention includes: after an access and mobility management function AMF entity determines that a service request message sent by the UE is received, sending, by the AMF entity to an SMF entity, a first message that is used by the SMF entity to determine whether a location of the UE is outside an area corresponding to the first PDU session; receiving, by the AMF entity, a first parameter that is sent by the SMF entity and that is used to instruct the UE to send a request used to re-establish or modify the first PDU session; and sending, by the AMF entity, the first parameter to the UE.

With reference to the third aspect, in a first possible implementation of the third aspect, the first parameter includes an identifier of the first PDU session and a first indication, the identifier is used to identify the first PDU session, and the first indication is used to instruct the UE to send a request used to re-establish the first PDU session associated with the identifier.

With reference to the third aspect or the first possible implementation of the third aspect, in a second possible implementation of the third aspect, after the access and mobility management function AMF entity determines that the service request message sent by the UE is received and before the AMF entity obtains location information of the UE, the method provided in this embodiment of the present invention further includes: receiving, by the AMF entity, the area that is corresponding to the first PDU session and that is sent by the SMF entity; or receiving, by the AMF entity, an identifier that is of a UPF entity corresponding to the first PDU session and that is sent by the SMF entity, where the identifier of the UPF entity is used by the AMF entity to determine the area corresponding to the first PDU session.

With reference to any one of the third aspect to the second possible implementation of the third aspect, in a third possible implementation of the third aspect, the first message carries the location information of the UE or a second indication used to indicate that the location of the UE is outside the area corresponding to the first PDU session.

According to a fourth aspect, an embodiment of the present invention provides a session management method, including: in a process in which user equipment UE establishes a first protocol data unit PDU session with a session management function SMF entity, receiving, by the UE, a first message that is sent by the SMF entity and that includes an area corresponding to the first PDU session; and when the UE determines, based on the area corresponding to the first PDU session, that the UE meets a first condition, sending, by the UE to a target entity, a second message used to indicate that the UE moves out of the area corresponding to the first PDU session, where the first condition includes that the UE moves out of the area corresponding to the first PDU session.

In the session management method provided in this application, in the process in which the UE establishes the first PDU session with the SMF entity, the SMF entity provides, for the UE, the area corresponding to the first PDU session. In this way, when the UE is in an idle state, once the UE is outside the area corresponding to the first PDU session, the UE triggers a PDU session modification request message to update the area corresponding to the first PDU session. In this process, the SMF entity performs UPF relocation. Therefore, it may be ensured that UPF entity relocation is performed before data is transmitted, so as to ensure that data is not lost.

With reference to the fourth aspect, in a first possible implementation of the fourth aspect, the first message further includes a first indication, and the first indication is used to instruct the UE to send the second message to the target entity after the UE determines that the UE moves out of the area corresponding to the first PDU session, and when a status of the UE is switched from an idle state to a connected state or when the UE has uplink data arriving in the first PDU session; and the first condition further includes that the status of the UE is switched from the idle state to the connected state.

With reference to the fourth aspect or the first possible implementation of the fourth aspect, in a second possible implementation of the fourth aspect, the method provided in this embodiment of the present invention further includes: when determining that the UE moves out of the area corresponding to the first PDU session, marking, by the UE, the first PDU session with a to-be-updated state. In this way, the UE may directly send the second message to the target entity when determining that the UE is switched from the idle state to the connected state or when the UE has the uplink data arriving in the first PDU session.

With reference to any one of the fourth aspect to the second possible implementation of the fourth aspect, in a third possible implementation of the fourth aspect, if the target entity is the session management function SMF entity, the second message is a PDU session modification request message that is sent by the UE to the SMF entity and that carries at least one of location information of the UE and a second indication, where the second indication is used to indicate that the UE moves out of the area corresponding to the first PDU session.

With reference to any one of the fourth aspect to the third possible implementation of the fourth aspect, in a fourth possible implementation of the fourth aspect, the target entity is an access and mobility management function AMF entity, and the second message is a service request message sent by the UE to the AMF entity, where the service request message carries a first indication, and the first indication is used to indicate that the UE moves out of the area corresponding to the first PDU session.

With reference to any one of the fourth aspect to the fourth possible implementation of the fourth aspect, in a fifth possible implementation of the fourth aspect, the second message is a registration request message sent by the UE to the AMF entity, the registration request message carries a first cause value, and the first cause value is used to indicate that the UE moves out of the area corresponding to the first PDU session.

With reference to any one of the fourth aspect to the fifth possible implementation of the fourth aspect, in a sixth possible implementation of the fourth aspect, after the UE determines that the UE moves out of the area corresponding to the first PDU session, and sends the second message to the target entity, the method provided in this embodiment of the present invention further includes: receiving, by the UE, a third message that is sent by the target entity and that includes a first area, where the first area is an updated area of the first PDU session; and updating, by the UE based on the third message to the first area, the area corresponding to the first PDU session.

With reference to any one of the fourth aspect to the sixth possible implementation of the fourth aspect, in a seventh possible implementation of the fourth aspect, the third message further includes a first IP address, and the first IP address is an updated IP address of the first PDU session; and the method further includes: updating, by the UE to the first IP address, an IP address corresponding to the first PDU session.

With reference to any one of the fourth aspect to the seventh possible implementation of the fourth aspect, in an eighth possible implementation of the fourth aspect, when the target entity is the SMF entity, the third message is a PDU session modification accept message sent by the AMF entity to the UE; or when the target entity is the AMF entity, the third message is a service accept message sent by the AMF entity to the UE; or when the target entity is the AMF entity, the third message is a registration accept message sent by the AMF entity to the UE.

According to a fifth aspect, an embodiment of the present invention provides a session management method, including: in a process in which user equipment UE establishes a first protocol data unit PDU session with a session management function SMF entity, sending, by the SMF entity to the UE, a first message that includes an area corresponding to the first PDU session; receiving, by the SMF entity, a second message that is sent by the UE and that is used to indicate that the UE moves out of the area corresponding to the first PDU session; and updating, by the SMF entity based on the second message, the area corresponding to the first PDU session, or reselecting a second UPF entity based on the second message to establish a second PDU session.

With reference to the fifth aspect, in a first possible implementation of the fifth aspect, the method further includes: sending, by the SMF entity, a third message to the UE, where the third message carries a first area, and the first area is an updated area of the first PDU session.

With reference to the fifth aspect or the first possible implementation of the fifth aspect, in a second possible implementation of the fifth aspect, the third message further carries a first IP address, and the first IP address is an updated IP address of the first PDU session.

With reference to any one of the fifth aspect to the second possible implementation of the fifth aspect, in a third possible implementation of the fifth aspect, the first message carries a first indication that is used to instruct the UE to send the second message to the SMF entity when the UE determines that the UE moves out of the area corresponding to the first PDU session.

With reference to any one of the fifth aspect to the third possible implementation of the fifth aspect, in a fourth possible implementation of the fifth aspect, the first indication is further used to instruct the UE to send the second message to the SMF entity when a status of the UE is switched from an idle state to a connected state or when the UE has uplink data arriving in the first PDU session.

With reference to any one of the fifth aspect to the fourth possible implementation of the fifth aspect, in a fifth possible implementation of the fifth aspect, the second message carries location information of the UE, and the updating, by the SMF entity based on the second message, the area corresponding to the first PDU session, or reselecting a second UPF entity based on the second message to establish a second PDU session includes: if a session and service continuity mode of the first PDU session is a first session mode or a second session mode, when determining that the UE moves out of the area corresponding to the first PDU session and that the UE is inside a service area of a user plane function UPF entity corresponding to the first PDU session, updating, by the SMF entity, the area corresponding to the first PDU session; or reselecting, by the SMF entity, a second UPF entity when determining that the UE moves out of the area corresponding to the first PDU session and that the UE moves out of a service area of a UPF entity corresponding to the first PDU session.

According to a sixth aspect, an embodiment of the present invention provides user equipment, where the user equipment UE has a first protocol data unit PDU session, and the UE includes: a sending unit, configured to send a service request message to an access and mobility management function AMF entity; a receiving unit, configured to receive a first message sent by the AMF entity; and a determining unit, configured to determine, by the UE based on the first message, to re-establish or modify the first PDU session.

With reference to the sixth aspect, in a first possible implementation of the sixth aspect, the first message is a service accept message, the service accept message carries an identifier of the first PDU session and a first indication, the identifier is used to identify the first PDU session, and the first indication is used to instruct to re-establish or modify the first PDU session associated with the identifier.

With reference to the sixth aspect or the first possible implementation of the sixth aspect, in a second possible implementation of the sixth aspect, the determining unit is configured to: if the first indication is used to instruct the UE to modify the first PDU session associated with the identifier, determine, by the UE based on the identifier and the first indication, to modify the first PDU session; or if the first indication is used to instruct the UE to re-establish the first PDU session associated with the identifier, determine, based on the identifier and the first indication, to re-establish the first PDU session.

With reference to any one of the sixth aspect to the second possible implementation of the sixth aspect, in a third possible implementation of the sixth aspect, the first message is a service accept message, the service accept message carries an identifier of the first PDU session, the identifier is used to instruct to re-establish or modify the first PDU session associated with the identifier, and the determining unit includes: determining, based on the identifier, to re-establish or modify the first PDU session.

With reference to any one of the sixth aspect to the third possible implementation of the sixth aspect, in a fourth possible implementation of the sixth aspect, the first message is a service reject message, the service reject message carries an identifier of the first PDU session and a cause value, the identifier is used to identify the first PDU session, and the cause value indicates that the UE moves out of an area corresponding to the first PDU session associated with the identifier.

With reference to any one of the sixth aspect to the fourth possible implementation of the sixth aspect, in a fifth possible implementation of the sixth aspect, the determining unit is further configured to determine, by the UE based on the identifier and the cause value, to re-establish or modify the first PDU session associated with the identifier.

With reference to any one of the first aspect to the sixth possible implementation of the first aspect, in a seventh possible implementation of the first aspect, the sending unit is further configured to send, by the UE to the AMF entity, a second message used to request to re-establish or modify the first PDU session.

According to a seventh aspect, an embodiment of the present invention provides an SMF entity, where user equipment UE has a first protocol data unit PDU session, and the SMF entity includes: a receiving unit, configured to receive a first message that is sent by an access and mobility management function AMF entity and that is used to instruct the SMF entity to determine whether the UE moves out of an area corresponding to the first PDU session; and a sending unit, configured to: when determining, based on the first message, that the UE moves out of a service area of a UPF entity corresponding to the first PDU session, send, by the SMF entity to the UE by using the AMF entity, a first parameter that is used to instruct the UE to send a request used to re-establish or modify the first PDU session.

With reference to the seventh aspect, in a first possible implementation of the seventh aspect, the first parameter includes an identifier of the first PDU session and a first indication, the identifier is used to identify the first PDU session, and the first indication is used to instruct the UE to send a request used to re-establish or modify the first PDU session associated with the identifier.

With reference to the seventh aspect or the first possible implementation of the seventh aspect, in a second possible implementation of the seventh aspect, the sending unit is further configured to send, to the AMF entity, the area corresponding to the first PDU session; or the sending unit is further configured to send, to the AMF entity, an identifier of the user plane function UPF entity corresponding to the first PDU session, where the identifier of the UPF entity is used by the AMF entity to determine the area corresponding to the first PDU session.

With reference to any one of the seventh aspect to the second possible implementation of the seventh aspect, in a third possible implementation of the seventh aspect, the first message carries location information of the UE, or the first message carries a second indication used to indicate that the UE moves out of the area corresponding to the first PDU session.

With reference to any one of the seventh aspect to the third possible implementation of the seventh aspect, in a fourth possible implementation of the seventh aspect, the SMF entity further includes: a determining unit, configured to determine a session continuity mode of the first PDU session, where the sending unit is specifically configured to: when the SMF entity determines that the session continuity mode of the first PDU session is a first session mode or a second session mode, send, by the SMF entity, the first parameter to the UE by using the AMF entity.

According to an eighth aspect, an embodiment of the present invention provides an access and mobility management function AMF entity, where user equipment UE has a first protocol data unit PDU session, and the AMF entity provided in this embodiment of the present invention includes: a sending unit, configured to: when determining that a service request message sent by the UE is received, send, to an SMF entity, a first message that is used by the SMF entity to determine whether a location of the UE is outside an area corresponding to the first PDU session; and a receiving unit, configured to receive a first parameter that is sent by the SMF entity and that is used to instruct the UE to send a request used to re-establish or modify the first PDU session, where the sending unit is configured to send the first parameter to the UE.

With reference to the eighth aspect, in a first possible implementation of the eighth aspect, the first parameter includes an identifier of the first PDU session and a first indication, the identifier is used to identify the first PDU session, and the first indication is used to instruct the UE to send a request used to re-establish the first PDU session associated with the identifier.

With reference to the eighth aspect or the first possible implementation of the eighth aspect, in a second possible implementation of the eighth aspect, the access and mobility management function AMF entity further includes: a receiving unit, configured to receive the area that is corresponding to the first PDU session and that is sent by the SMF entity; or a receiving unit, configured to receive an identifier that is of a UPF entity corresponding to the first PDU session and that is sent by the SMF entity, where the identifier of the UPF entity is used by the AMF entity to determine the area corresponding to the first PDU session.

With reference to any one of the eighth aspect to the second possible implementation of the eighth aspect, in a third possible implementation of the eighth aspect, the first message carries location information of the UE or a second indication used to indicate that the location of the UE is outside the area corresponding to the first PDU session.

According to a ninth aspect, an embodiment of the present invention provides user equipment, including: a receiving unit, configured to: in a process in which the user equipment UE establishes a first protocol data unit PDU session with a session management function SMF entity, receive a first message that is sent by the SMF entity and that includes an area corresponding to the first PDU session; and a sending unit, configured to: when determining, based on the area corresponding to the first PDU session, that the UE meets a first condition, send, to a target entity, a second message used to indicate that the UE moves out of the area corresponding to the first PDU session, where the first condition includes that the UE moves out of the area corresponding to the first PDU session.

With reference to the ninth aspect, in a first possible implementation of the ninth aspect, the first message further includes a first indication, and the first indication is used to instruct the UE to send the second message to the target entity after the UE determines that the UE moves out of the area corresponding to the first PDU session, and when a status of the UE is switched from an idle state to a connected state or when the UE has uplink data arriving in the first PDU session; and the first condition further includes that the status of the UE is switched from the idle state to the connected state.

With reference to the ninth aspect or the first possible implementation of the ninth aspect, in a second possible implementation of the ninth aspect, the UE provided in this embodiment of the present invention further includes: a marking unit, configured to mark the first PDU session with a to-be-updated state when determining that the UE moves out of the area corresponding to the first PDU session.

With reference to any one of the ninth aspect to the second possible implementation of the ninth aspect, in a third possible implementation of the ninth aspect, if the target entity is the session management function SMF entity, the second message is a PDU session modification request message that is sent by the UE to the SMF entity and that carries at least one of location information of the UE and a second indication, where the second indication is used to indicate that the UE moves out of the area corresponding to the first PDU session.

With reference to any one of the ninth aspect to the third possible implementation of the ninth aspect, in a fourth possible implementation of the ninth aspect, the target entity is an access and mobility management function AMF entity, and the second message is a service request message sent by the UE to the AMF entity, where the service request message carries a first indication used to indicate that the UE moves out of the area corresponding to the first PDU session.

With reference to any one of the ninth aspect to the fourth possible implementation of the ninth aspect, in a fifth possible implementation of the ninth aspect, the second message is a registration request message sent by the UE to the AMF entity, and the registration request message carries a first cause value used to indicate that the UE moves out of the area corresponding to the first PDU session.

With reference to any one of the ninth aspect to the fifth possible implementation of the ninth aspect, in a sixth possible implementation of the ninth aspect, the UE provided in this embodiment of the present invention further includes: a receiving unit, configured to receive a third message that is sent by the target entity and that includes a first area, where the first area is an updated area of the first PDU session; and the UE provided in this embodiment of the present invention further includes: an updating unit, configured to update, based on the third message to the first area, the area corresponding to the first PDU session.

With reference to any one of the ninth aspect to the sixth possible implementation of the ninth aspect, in a seventh possible implementation of the ninth aspect, the third message further includes a first IP address, the first IP address is an updated IP address of the first PDU session, and the updating unit is configured to update, by the UE to the first IP address, an IP address corresponding to the first PDU session.

With reference to any one of the ninth aspect to the seventh possible implementation of the ninth aspect, in an eighth possible implementation of the ninth aspect, when the target entity is the SMF entity, the third message is a PDU session modification accept message sent by the AMF entity to the UE; or when the target entity is the AMF entity, the third message is a service accept message sent by the AMF entity to the UE; or when the target entity is the AMF entity, the third message is a registration accept message sent by the AMF entity to the UE.

According to a tenth aspect, an embodiment of the present invention provides a session management function SMF entity, including: a sending unit, configured to: in a process in which user equipment UE establishes a first protocol data unit PDU session with the session management function SMF entity, send, to the UE, a first message that includes an area corresponding to the first PDU session; a receiving unit, configured to receive a second message that is sent by the UE and that is used to indicate that the UE moves out of the area corresponding to the first PDU session; and a processing unit, configured to: update, based on the second message, the area corresponding to the first PDU session, or reselect a second UPF entity based on the second message to establish a second PDU session.

With reference to the tenth aspect, in a first possible implementation of the tenth aspect, the sending unit provided in this embodiment of the present invention is further configured to send, to the UE, a third message that carries a first area, where the first area is an updated area of the first PDU session.

With reference to the tenth aspect or the first possible implementation of the tenth aspect, in a second possible implementation of the tenth aspect, the third message further carries a first IP address, and the first IP address is an updated IP address of the first PDU session.

With reference to any one of the tenth aspect to the second possible implementation of the tenth aspect, in a third possible implementation of the tenth aspect, the first message carries a first indication that is used to instruct the UE to send the second message to the SMF entity when the UE determines that the UE moves out of the area corresponding to the first PDU session.

With reference to any one of the tenth aspect to the third possible implementation of the tenth aspect, in a fourth possible implementation of the tenth aspect, the first indication is further used to instruct the UE to send the second message to the SMF entity when a status of the UE is switched from an idle state to a connected state or when the UE has uplink data arriving in the first PDU session.

With reference to any one of the tenth aspect to the fourth possible implementation of the tenth aspect, in a fifth possible implementation of the tenth aspect, the second message carries location information of the UE, and the processing unit is specifically configured to: if a session and service continuity mode of the first PDU session is a first session mode or a second session mode, when the SMF entity determines that the UE moves out of the area corresponding to the first PDU session and that the UE is inside a service area of a user plane function UPF entity corresponding to the first PDU session, update the area corresponding to the first PDU session; or reselect a second UPF entity when the SMF entity determines that the UE moves out of the area corresponding to the first PDU session and that the UE moves out of a service area of a UPF entity corresponding to the first PDU session.

According to an eleventh aspect, an embodiment of the present invention provides user equipment, including a memory, a processor, a bus, and a transceiver, where the memory stores code and data, the processor and the memory are connected by using the bus, and the processor runs the code in the memory, so that the user equipment performs the session management method described in any one of the first aspect to the sixth possible implementation of the first aspect, or the session management method described in any one of the fourth aspect to the eighth possible implementation of the fourth aspect.

According to a twelfth aspect, an embodiment of the present invention provides a session management function SMF entity, including a memory, a processor, a bus, and a transceiver, where the memory stores code and data, the processor and the memory are connected by using the bus, and the processor runs the code in the memory, so that the SMF entity performs the session management method described in any one of the second aspect to the fourth possible implementation of the second aspect, or the session management method described in any one of the fifth aspect to the fifth possible implementation of the fifth aspect.

According to a thirteenth aspect, an embodiment of the present invention provides an access and mobility management function AMF entity, including a memory, a processor, a bus, and a transceiver, where the memory stores code and data, the processor and the memory are connected by using the bus, and the processor runs the code in the memory, so that the AMF entity performs the session management method described in any one of the third aspect to the fourth possible implementation of the third aspect.

According to a fourteenth aspect, an embodiment of the present invention provides a computer readable storage medium, including an instruction, and when the computer readable storage medium runs on an AMF entity, the AMF entity performs the session management method described in any one of the third aspect to the fourth possible implementation of the third aspect; or when the computer readable storage medium runs on an SMF entity, the SMF entity performs the session management method described in any one of the second aspect to the fourth possible implementation of the second aspect, or the session management method described in any one of the fifth aspect to the fifth possible implementation of the fifth aspect; or when the computer readable storage medium runs on user equipment, the user equipment performs the session management method described in any one of the first aspect to the sixth possible implementation of the first aspect, or the session management method described in any one of the fourth aspect to the eighth possible implementation of the fourth aspect.

According to a fifteenth aspect, an embodiment of the present invention provides a session management system, including the AMF entity described in the thirteenth aspect or the eighth aspect, the SMF entity described in the twelfth aspect, in any one of the seventh aspect to the fourth possible implementation of the seventh aspect, or in any one of the tenth aspect to the fifth possible implementation of the tenth aspect, and the user equipment described in the sixth aspect or the eleventh aspect.

DESCRIPTION OF EMBODIMENTS

Figure 1:
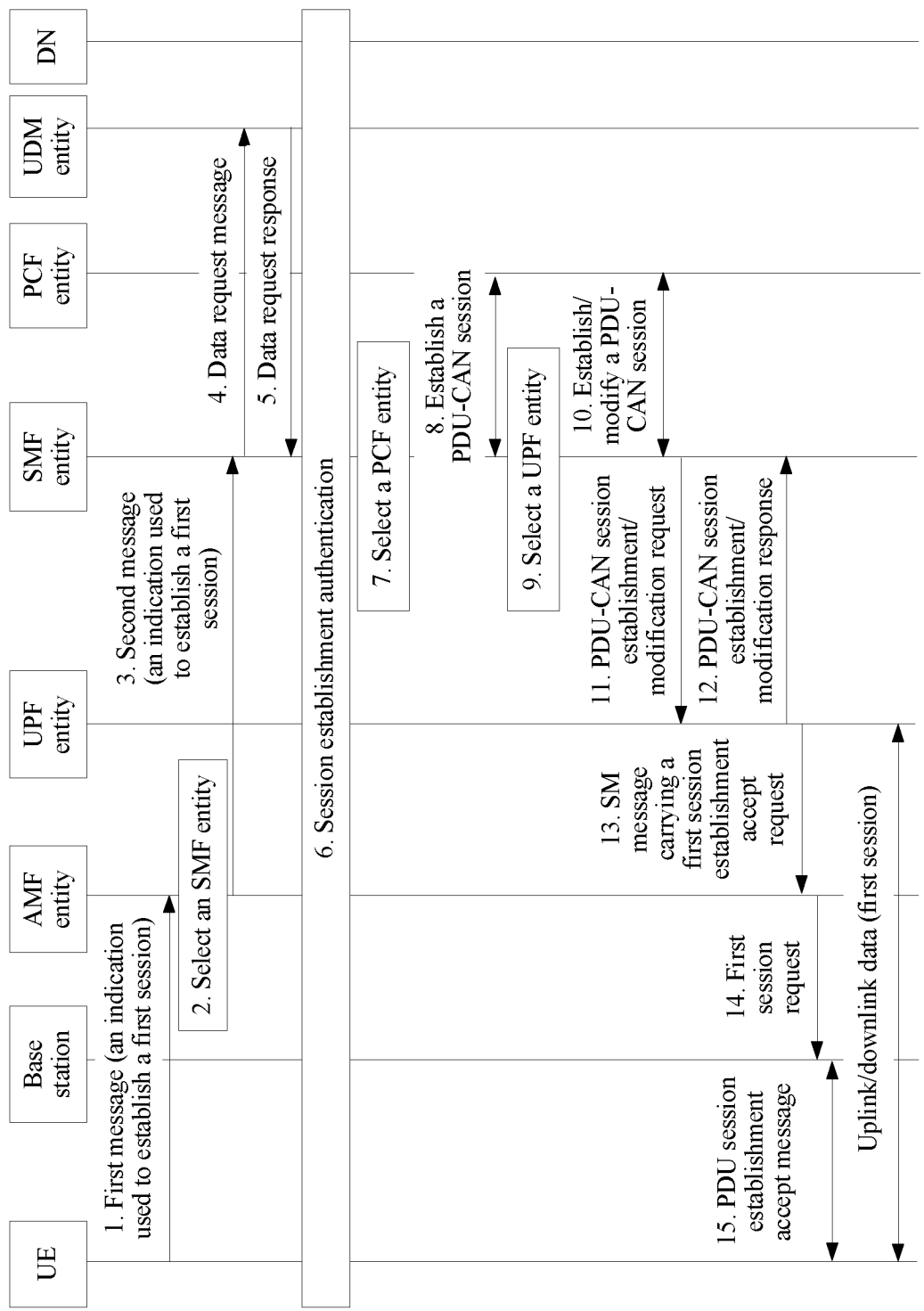
FIG. 1 is a first schematic flowchart of a session establishment method in the prior art.

To facilitate clear description of the technical solutions in the embodiments of the present invention, words such as "first" and "second", are used in the embodiments of the present invention to distinguish between same items or similar items with basically same functions or purposes. A person skilled in the art may understand that the words such as "first" and "second" do not restrict a quantity and an implementation sequence.

In the embodiments of the present invention, a PDU session is a connection between UE and a data network that is used to provide a connection service. A type of the connection may include an IP type, an Ethernet type (Ethernet type), and a non-IP type.

An idle state or a connected state in the embodiments of the present invention is a connection management (Connection Management) status of UE. That the UE is in an idle state means that the connection management status of the UE is the idle state, namely, CM-IDLE.

That the UE is in a connected state means that the connection management status of the UE is the connected state, namely, CM-CONNECTED.

In the embodiments of the present invention, an active status of a session means whether a user plane connection that is corresponding to the session and that is between UE and a UPF entity exists, including whether a DRB (data radio bearer) between the UE and a base station and an N3 connection between the base station and the UPF entity exist.

That the session is in an active state means that the user plane connection that is corresponding to the session and that is between the UE and the UPF entity exists. To be specific, the DRB and the N3 connection that are corresponding to the session both exist. The UE can directly receive and send data in the session.

That the session is in an inactive state means that the user plane connection between the UE and the UPF entity does not exist. Specifically, at least one of the data radio bearer (data radio bearer, DRB) between the UE and the base station, and the N3 connection between the base station and the UPF entity does not exist. The UE cannot directly receive and send data in the session. If in the session, there is uplink data that needs to be sent, or when there is downlink data arriving in the session, the UE first needs to perform a service request procedure to activate the session, and the UE can receive and send data only after the session is switched to an active state.

It may be understood that, that a session is in an active state or an inactive state is specific to an established session.

In the embodiments of the present invention, a UPF service area means that for a PDU session, provided that a location of UE is inside the service area, a redirection (namely, relocation) process does not need to be performed on a UPF entity corresponding to the PDU session. The UPF service area may be a set of base stations that a UPF entity can control or to which the UPF entity can be connected, a set of tracking areas (Tracking Area) to which these base stations belong, or a set of cells (cell) that these base stations include.

In the embodiments of the present invention, an area corresponding to a PDU session is a UPF service area of a UPF entity that serves the PDU session, or a particular quantity of subsets selected by using UE as a center from a UPF service area of a UPF entity that serves the PDU session, or a set of a service area of a UPF entity that serves the PDU session and a service area of an adjacent UPF entity that has a same function as the UPF entity, where the set is selected by UE as a center. It should be noted that, the UPF entity may be an anchor UPF entity that serves the PDU session, or may be another UPF entity that serves the PDU session.

It should be noted that a use scenario of the embodiments of the present invention is as follows: UE has a first PDU session. When the first PDU session is in an inactive state, and when a UPF entity corresponding to the first PDU session cannot serve the first PDU session (for example, the UE is outside a service area of the UPF entity corresponding to the first PDU session) as a location of the UE moves, a network or the UE triggers UPF relocation. That the first PDU session in the scenario is in an inactive state includes the following case: The UE is in an idle state, or the UE is in a connected state but the session is in an inactive state.

Figure 2:
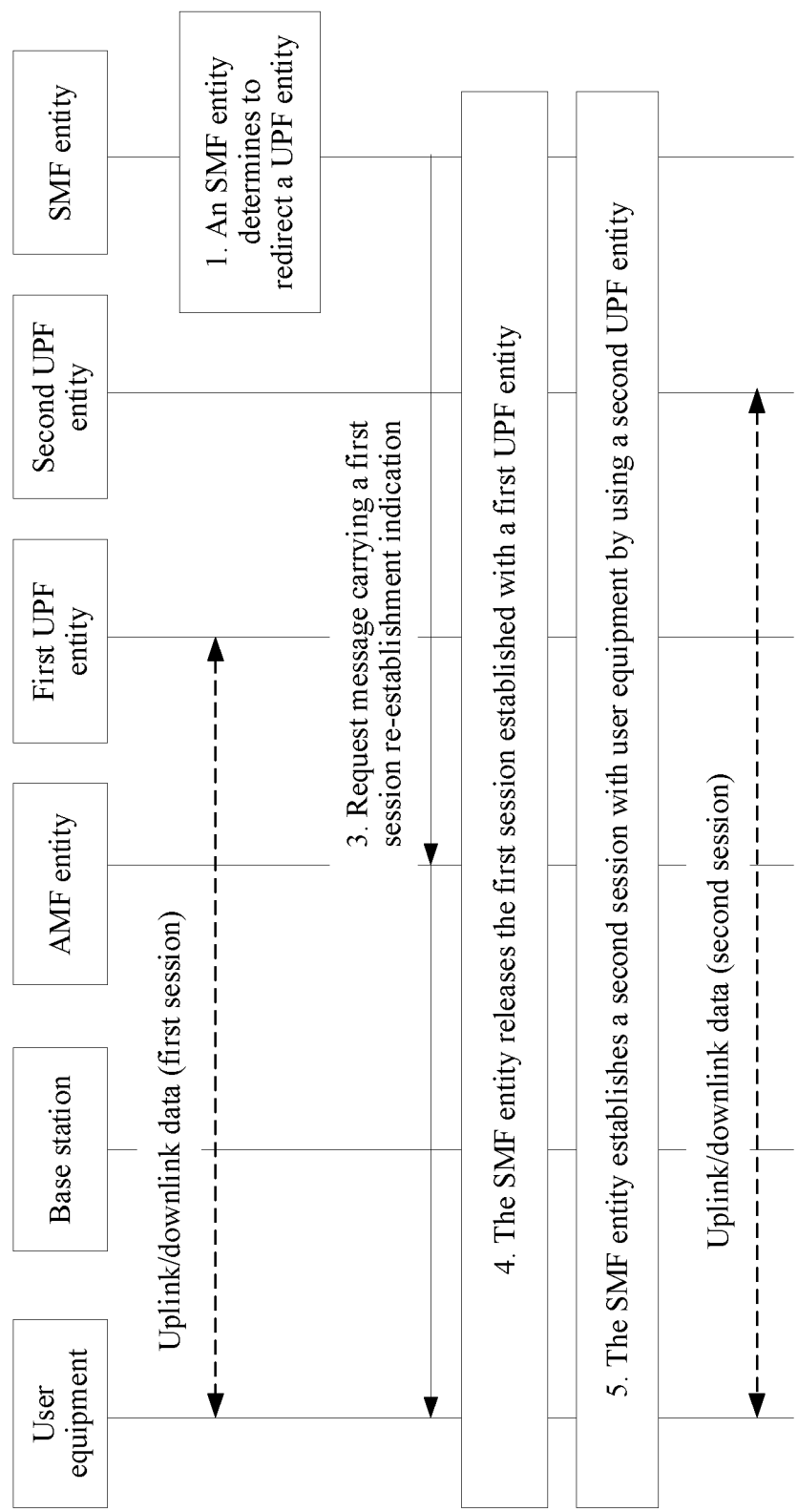
FIG. 2 is a second schematic flowchart of a session management method in the prior art.

A service continuity mode of a first PDU session in the embodiments of the present invention may be a first session mode (also referred to as SSC1). The SSC1 means that a network triggers releasing of the first PDU session and instructs UE to re-establish the first PDU session, and that a re-established first PDU session has a same DN as the first PDU session. Certainly, the re-established first PDU session may be understood as a second PDU session, and the second PDU session may replace the first PDU session. As shown in FIG. 2, when determining that a UPF entity needs to be relocated, an SMF entity sends, to user equipment by using an AMF entity, a request message (for example, a request message shown in FIG. 2) used to instruct to re-establish a session. The SMF entity first releases a first PDU session established with the user equipment by using a first UPF entity. Then the SMF entity establishes, by using a second UPF entity, a second PDU session with the user equipment based on a session management connection request sent by the user equipment. Finally, the UE sends data by using the second UPF entity that serves the second PDU session. To be specific, the first PDU session is released before the second PDU session is established.

Figure 3:
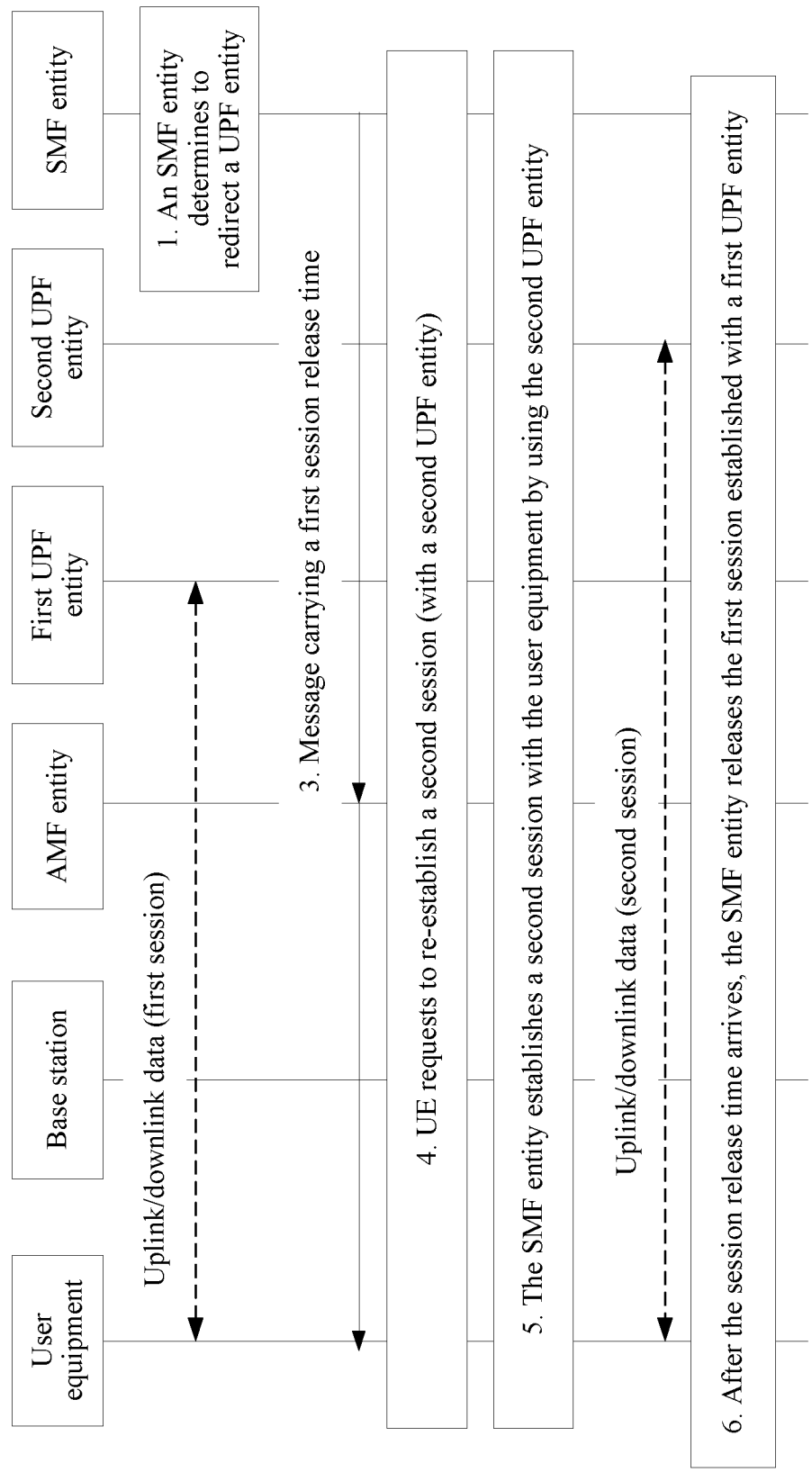
FIG. 3 is a third schematic flowchart of a session management method in the prior art.

As shown in FIG. 3, a service continuity mode of a first PDU session in the embodiments of the present invention may be a second session mode (also referred to as a session and service continuity second session mode, SSC2). The SSC2 means that a network allows that a second PDU session (a connection established between UE and a second UPF entity) is first established before a first PDU session (a connection established between the UE and a first UPF entity) is released. To be specific, an SMF entity first sends a first message to the UE by using an AMF entity. The first message is used to instruct the user equipment to send a session management connection request in a session release time, so that the SMF entity establishes a second PDU session with the user equipment by using the second UPF entity, and the SMF entity releases, after the session release time arrives, a first PDU session established with the user equipment, that is, a first PDU session established by the SMF entity with the user equipment by using the first UPF entity. To be specific, the first PDU session is released by the SMF entity after the second PDU session is established.

The SSC1 means that a network side may trigger releasing of a first PDU session and instruct UE to immediately establish a second PDU session, and that the second PDU session has a same data network DN as the first PDU session. In the SSC1, the first PDU session is first released, and then the second PDU session is established.

The SSC2 means that a network side may trigger UE to establish a second PDU session, and that the second PDU session has a same data network DN as a first PDU session. In the SSC2, the second PDU session is first established, and then the first PDU session is released.

The service continuity mode of the first PDU session in the embodiments of the present invention is mainly the first mode or the second mode, and certainly, may be another mode. The service continuity mode of the first PDU session is not specially limited in the present invention. For the first session mode and the second session mode, a UPF entity may be relocated. In this way, a session in the first session mode and that in the second session mode each are related to a particular area (for example, a UPF service area). However, in a conventional solution, it is only defined that an SMF entity relocates a UPF entity when the first session is in an active state. However, regardless of whether the SMF entity uses the session and service continuity first session mode or the session and service continuity second session mode, it is not defined how to relocate a UPF entity if the first session is in an inactive state (UE is in an idle state, or the UE is in a connected state but the session is in an inactive state). As a result, a UPF entity relocation procedure is not performed for the first session in an inactive state, and a location of the UE may be outside a service area of a first UPF entity as the UE moves. Consequently, when the UE has data to be sent/received and enters a connected state, a base station cannot establish a connection to a UPF entity that serves the first session, and the UE cannot normally receive/send data in the first session.

In an aspect, when the UE is started to activate the first PDU session (establish a user plane connection of the first PDU session) or response to paging, the SMF entity determines, based on the location of the UE, a UPF service area corresponding to the first PDU session, a mode of the first PDU session, and a carrier policy, whether a UPF entity needs to be relocated. To be specific, when determining that the location of the UE is outside the service area of the UPF entity, the SMF entity determines to relocate a UPF entity; or when determining that the location of the UE is outside the service area of the UPF entity, the SMF entity determines, with reference to the mode of the first PDU session (the first session mode or the second session mode) and/or the carrier policy, to relocate a UPF entity. If a UPF entity needs to be directed, the SMF entity sends, by using an AMF entity to the UE, an identifier of the first PDU session and an indication used to re-establish or modify the first PDU session. After the SMF entity sends, by using an N11 message to the AMF entity, the identifier of the first PDU session and the indication used to re-establish or modify the first PDU session, the AMF entity may encapsulate the identifier and the indication into a service accept message, and send the service accept message to the UE. Alternatively, the SMF entity may encapsulate the identifier and the indication into N1 SM information and sends the N1 SM information to the AMF entity, and then the AMF entity encapsulates the identifier and the indication into a service accept message and sends the service accept message to the UE. After the UE receives the identifier carrying the first PDU session and the indication used to re-establish the first PDU session, the UE requests to establish a second PDU session. In a process of establishing the second PDU session, the SMF entity selects a new UPF entity to serve the second PDU session. After the UE receives the identifier carrying the first PDU session and the indication used to modify the first PDU session, in a possible implementation, the UE triggers a PDU session modification procedure, to be specific, the UE sends a PDU session modification request message; in another more possible implementation, a network triggers a PDU session modification procedure. In the session modification process, the UPF entity corresponding to the first PDU session is relocated to a second UPF entity from the first UPF entity. (It may be understood that, in an embodiment of re-establishing the first PDU session in the present invention, the established second PDU session may be used to replace the first PDU session. The second PDU session and the first PDU session have a same DN. After re-establishment is completed, the original first PDU session may be deleted in a signaling manner, or may be deleted on a core network side (for example, the SMF entity/the AMF entity) and a UE side, to be specific, the UE locally deletes the original first PDU session.).

In another aspect, once the UE is outside an area corresponding to the first PDU session (for example, the service area of the UPF entity), UPF entity relocation is triggered. In this case, in a process in which the UE establishes the first PDU session with the SMF entity, the SMF entity provides, for the UE, the area corresponding to the first PDU session. In this way, when the UE is in an idle state, and when the UE detects that the UE moves out of the area corresponding to the first PDU session, the UE triggers a NAS procedure (for example, triggers a PDU session modification procedure or a registration request procedure to update the area corresponding to the first PDU session, or triggers a service request procedure). In this process, the SMF entity determines whether to perform UPF relocation. In this way, it may be ensured that UPF entity relocation is performed before data is transmitted, so as to ensure that data is not lost. In this embodiment, the area corresponding to the first PDU session may be the service area of the UPF entity corresponding to the first PDU session, a particular quantity of subsets selected from the service area of the UPF entity by using the UE as a center (for example, a particular quantity of base stations or a particular quantity of tracking areas), or a set of service areas that are of adjacent UPF entities and that use the UE as a center.

Figure 4:
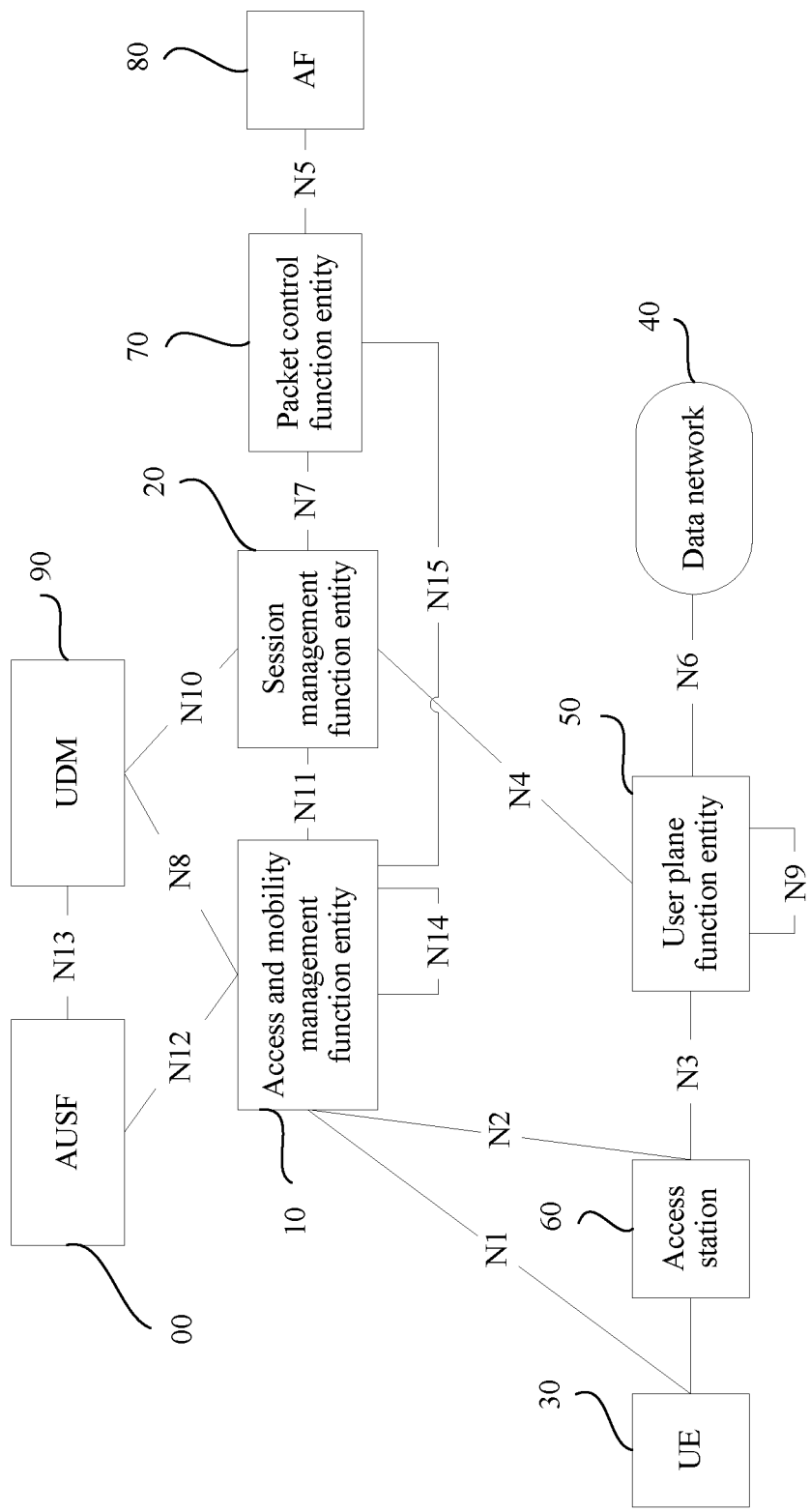
FIG. 4 is an architectural diagram of a system to which a session management method is applied according to an embodiment of the present invention.

As shown in FIG. 4, FIG. 4 is an architectural diagram of a system to which a session management method is applied according to an embodiment of the present invention. The system includes an access and mobility management function AMF entity 10, one or more session management function SMF entities 20, one or more user equipments UEs 30, a data network (Data Network, DN) 40, one or more user plane function UPF entities 50, an access station ((Radio) Access Node, (radio) access station) 60, a packet control function (Packet Control Function, PCF) entity 70, an application function (application function, AF) entity 80, a unified data management (Unified Data Management, UDM) entity 90 configured to store user subscription information, and an authentication server function (Authentication Server Function, AUSF) entity 00.

The access and mobility management function AMF entity 10 is configured to select an SMF entity based on a session connection establishment request sent by the UE 30, so that the selected SMF entity establishes a first PDU session between the UE 30 and the UPF entity 50.

The AMF entity 10 is further configured to forward, to the user equipment, a first message sent by the SMF entity. The first message is used to instruct the user equipment to send a second message (for example, a session connection establishment request message) used to request to establish the first PDU session. The second message is used to instruct to establish the first PDU session. In this way, after receiving the second message, the SMF entity may establish the first PDU session between the UE 30 and the UPF entity based on the second message.

Optionally, the AMF entity 10 stores a mapping relationship between an identifier of the first PDU session and the SMF entity that establishes the first PDU session, and is configured to establish a mapping relationship between identification information and the SMF entity based on the identification information configured by the SMF entity. In this way, in a session re-establishment process, the AMF entity may determine, based on the identifier of the first PDU session, an SMF entity to which a session re-establishment request is forwarded.

Optionally, the AMF entity 10 is further configured to: receive an area that is corresponding to the first PDU session and that is sent by the SMF entity or a service area that is of a UPF entity corresponding to the first PDU session and that is sent by the SMF entity; and store the area corresponding to the first PDU session or the service area of the UPF entity corresponding to the first PDU session. The AMF entity is further configured to: obtain location information of the UE based on a service request message sent by the UE; determine, based on the location information of the UE, whether a location of the UE is outside the area corresponding to the first PDU session; and then, when determining that the location of the UE is outside the area corresponding to the first PDU session, send, to the UE, a request message used to determine to re-establish the first PDU session, or send, to the SMF entity, the location information of the UE or a message indicating that the location of the UE is outside the area corresponding to the first PDU session.

The SMF entity 20 is configured to reallocate a UPF entity to the UE based on the location information of the UE 30 or a feature of data sent by the UE 30 or a location between the UPF entity 50 and the UE 30, and quality of service of a UPF entity, so as to re-establish a second PDU session between the UE and the newly allocated UPF entity, so that the re-established second PDU session can optimize a user plane. The SMF entity 20 is further configured to configure identification information. The identification information is used to instruct the AMF entity to send, to the SMF entity, a request used to re-establish the second PDU session. The session management function entity 20 is further configured to establish a session between the UE 30 and the UPF entity 50, such as a protocol data unit (Protocol Data Unit, PDU) session. The PDU session is used to connect the UE 30 and the DN 40, and the PDU session is used to provide a PDU data packet.

The SMF entity is further configured to receive the location information of the UE and an indication indicating that the location of the UE is outside the first PDU session, where the location information and the indication are sent by the AMF entity; and when the location of the UE is outside the area corresponding to the first PDU session, instruct the UE to establish a second PDU session to replace the first PDU session. The SMF entity is further configured to: send, to the UE, the area corresponding to the first PDU session; and send, to the AMF entity, the area corresponding to the first PDU session or the service area of the UPF entity corresponding to the first PDU session. The SMF entity is further configured to: when determining that the location of the UE is outside the area corresponding to the first PDU session but inside the service area of the UPF entity corresponding to the first PDU session, reallocate, to the UE, an area corresponding to the first PDU session.

The UE in this embodiment of the present invention is configured to: receive the area that is of the first PUU session and that is sent by the SMF entity; and when the location of the UE is outside the area corresponding to the first PDU session, send, to the AMF entity, an indication indicating that the location of the UE is outside the area of the first PDU session, so as to trigger the AMF entity/the SMF entity to perform relocation.

The plurality of user equipments UEs 30 are configured to communicate with the DN based on an established session.

The data network DN 40 is an external network configured to provide a data service.

The access station 60 is configured to provide a data service for the UE 30, for example, receive data sent by the UE 30 or send data to the UE 30. The access station 60 may be a base station in an actual use process. In this embodiment of the present invention, a base station (base station, BS) may be a device that communicates with the user equipment (user equipment, UE) or another communications station such as a relay station, and the base station may provide communication coverage in a specific physical area.

The PCF entity 70 is configured to be used as an interface between a radio frequency part and a packet network (an IP network).

The AF entity 80 is configured to play an effect on routing.

For example, as shown in FIG. 4, the AMF entity 10 and the SMF entity 20 communicate with each other through an interface N11. The AMF entity 10 and the UE 30 communicate with each other through an interface N1. The AMF entity 10 and the access station 60 communicate with each other through an interface N2. The AMF entity 10 and the AUSF entity 00 communicate with each other through an interface N12. The AMF entity 10 and the UDM entity communicate with each other through an interface N8. The AMF entity 10 and the PCF entity communicate with each other through an interface N15. The SMF entity 20 and the UDM entity 90 communicate with each other through an interface N10. The SMF entity 20 and the UPF entity 50 communicate with each other through an interface N4. The UPF entity 50 and the data network 40 communicate with each other through an interface N6. The PCF entity and the AF entity communicate with each other through an interface N5.

Figure 5:
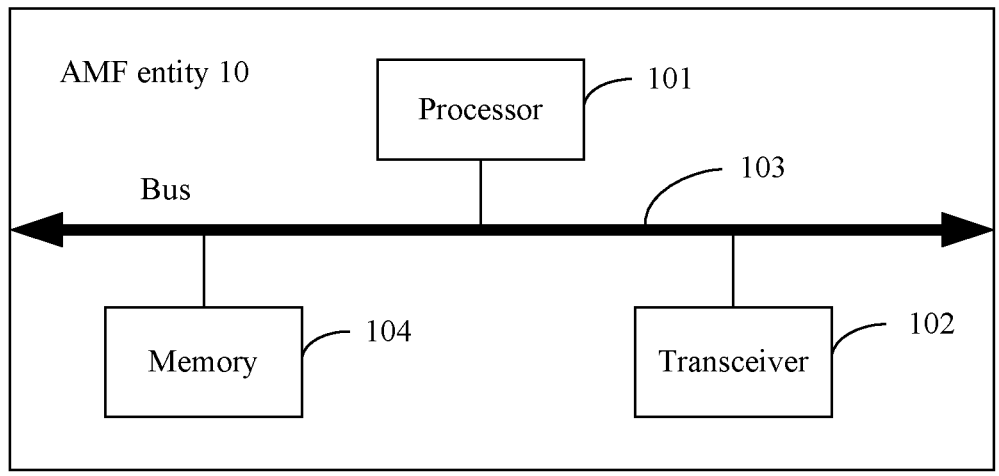
FIG. 5 is a schematic structural diagram of an AMF entity according to an embodiment of the present invention.

FIG. 5 is a schematic structural diagram of an AMF entity according to an embodiment of the present invention. It may be learned from FIG. 5 that an AMF entity 10 includes a processor 101, a transceiver 102, a memory 104, and a bus 103. The transceiver 102, the processor 101, and the memory 104 are interconnected by using the bus 103. The bus 103 may be a PCI bus, an EISA bus, or the like. The bus may be classified into an address bus, a data bus, a control bus, and the like. For ease of representation, only one bold line is used in FIG. 5, but it does not indicate that there is only one bus or one type of bus. The memory 104 is configured to store program code and data of the AMF entity 10. The transceiver 102 is configured to support the AMF entity 10 in communicating with another device. The processor 101 is configured to support the AMF entity 10 in executing the program code and the data stored in the memory 104, to implement a session management method provided in the embodiments of the present invention.

Figure 6:
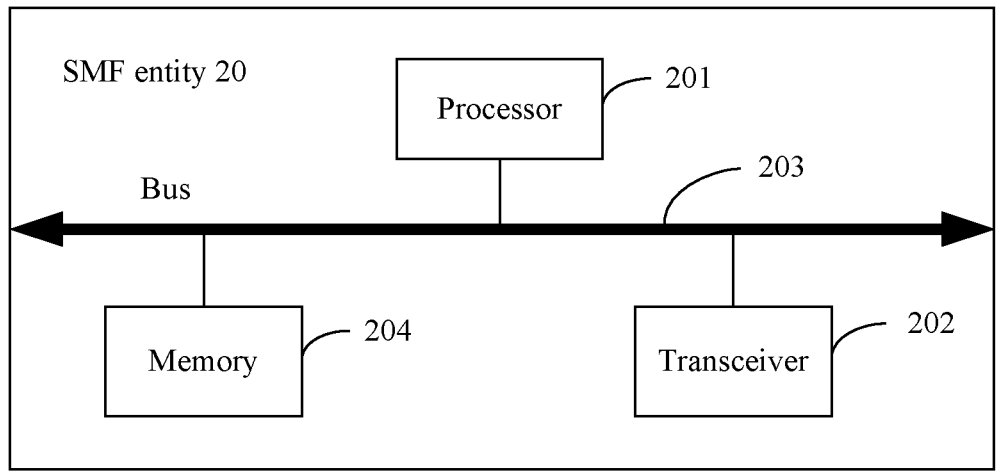
FIG. 6 is a schematic structural diagram of an SMF entity according to an embodiment of the present invention.

FIG. 6 is a schematic structural diagram of an SMF entity according to an embodiment of the present invention. It may be learned from FIG. 6 that an SMF entity 20 includes a processor 201, a transceiver 202, a memory 204, and a bus 203. The transceiver 202, the processor 201, and the memory 204 are interconnected by using the bus 203. The bus 203 may be a PCI bus, an EISA bus, or the like. The bus may be classified into an address bus, a data bus, a control bus, and the like. For ease of representation, only one bold line is used in FIG. 6, but it does not indicate that there is only one bus or one type of bus. The memory 204 is configured to store program code and data of the SMF entity 20. The transceiver 202 is configured to support the SMF entity 20 in communicating with another device. The processor 201 is configured to support the SMF entity 20 in executing the program code and the data stored in the memory 204, to implement a session management method provided in the embodiments of the present invention.

Figure 7:
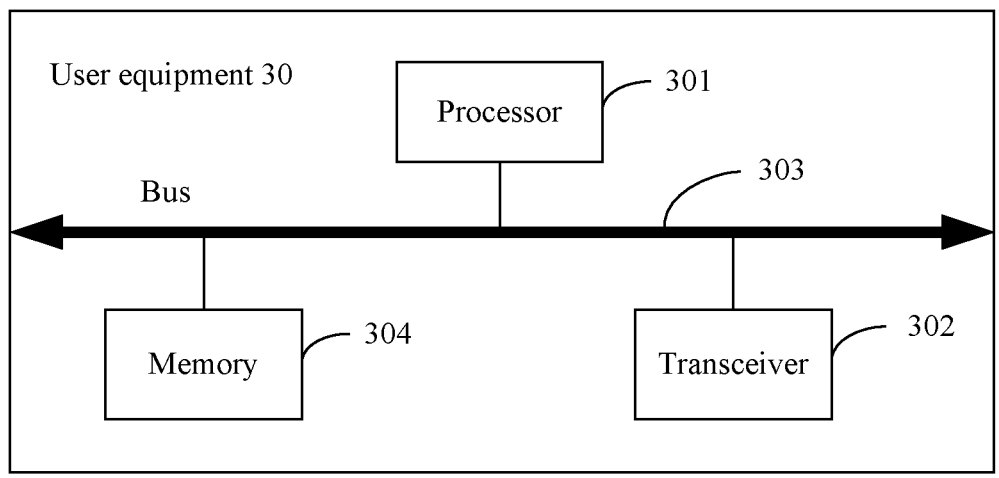
FIG. 7 is a schematic structural diagram of UE according to an embodiment of the present invention.

FIG. 7 is a schematic structural diagram of user equipment according to an embodiment of the present invention. It may be learned from FIG. 7 that user equipment 30 includes a processor 301, a transceiver 302, a memory 304, and a bus 303. The transceiver 302, the processor 301, and the memory 304 are interconnected by using the bus 303. The bus 303 may be a PCI bus, an EISA bus, or the like. The bus may be classified into an address bus, a data bus, a control bus, and the like. For ease of representation, only one bold line is used in FIG. 7, but it does not indicate that there is only one bus or one type of bus. The memory 304 is configured to store program code and data of the user equipment 30. The transceiver 302 is configured to support the user equipment 30 in communicating with another device. The processor 301 is configured to support the user equipment 30 in executing the program code and the data stored in the memory 304, to implement a session management method provided in the embodiments of the present invention.

In the embodiments of the present invention, UE may be distributed in an entire wireless network, and each UE may be stationary or in motion.

The UE may be a terminal (terminal), a mobile station (mobile station), a subscriber unit (subscriber unit), a station (station), or the like. The UE may be a cellular phone (cellular phone), a personal digital assistant (personal digital assistant, PDA), a wireless modem (Modem), a wireless communications device, a handheld (handheld) device, a laptop computer (laptop computer), a cordless phone (cordless phone), a wireless local loop (wireless local loop, WLL) station, or the like. When the UE is applied to communication in an M2M manner, the UE may be referred to as an M2M terminal, and may be specifically a smart meter, a smart appliance, or the like that supports M2M communication.

Figure 8:
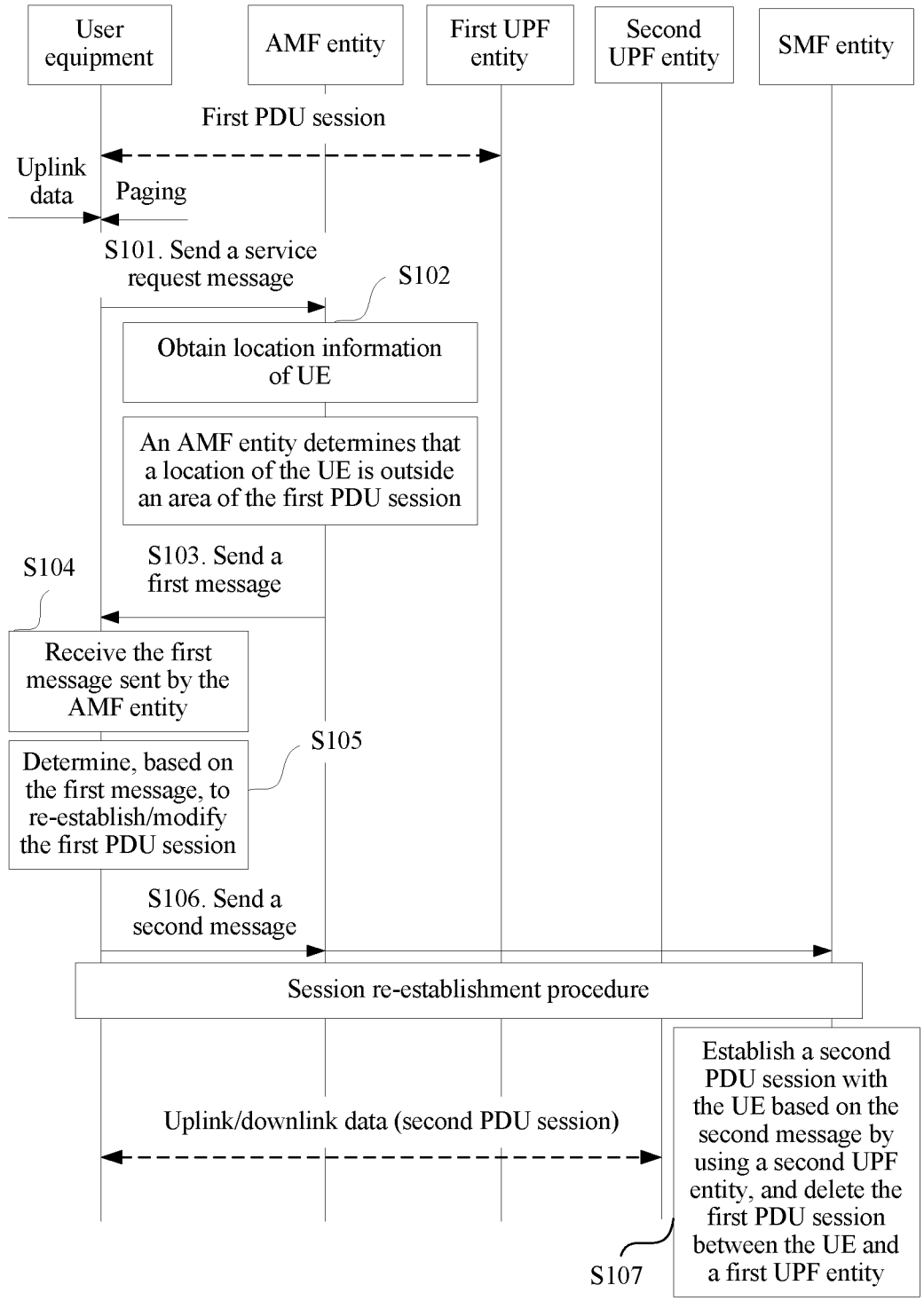
FIG. 8 is a first schematic flowchart of a session management method according to an embodiment of the present invention.

As shown in FIG. 8, FIG. 8 shows a session management method provided in an embodiment of the present invention. User equipment UE has a first protocol data unit PDU session, and the method includes the following steps:

S101. The UE sends a service request message to an access and mobility management function AMF entity.

S102. After the access and mobility management function AMF entity determines that the service request message sent by the UE is received, the AMF entity obtains location information of the UE, where the location information is used to determine a location of the UE.

Optionally, the location information of the UE may be a base station identifier (such as an ID) of a base station in which the UE is located, an ID of a cell in which the UE is located, or a tracking area identity (TAI) of a tracking area in which the base station is located.

S103. When determining that the UE moves out of an area corresponding to the first PDU session, the AMF entity sends a first message to the UE, where the first message is used to instruct to re-establish or modify the first PDU session.

Optionally, the area corresponding to the first PDU session may include the following cases: a service area of a UPF entity corresponding to the first PDU session; a partial area selected by using the location of the UE as a center from a service area of a UPF entity corresponding to the first PDU session; an area generated by an SMF entity with reference to a service area of a UPF entity corresponding to the first PDU session and a service area of an adjacent UPF entity having a same function as the UPF entity; an area determined by an SMF entity with reference to a registration (registration) area and a service area of a UPF entity, where the registration area is allocated by the AMF entity to the UE and received by the SMF entity, for example, an intersection set of the registration area and the service area of the UPF entity or a subset of an intersection set of the registration area and the service area of the UPF entity is selected as the area corresponding to the first PDU session; or an area that is corresponding to the first PDU session and that is generated by an SMF entity with reference to a registration area, a service area of a selected UPF entity, and a service area of an adjacent UPF entity having a same function as the UPF entity, where the registration area is allocated by the AMF entity to the UE and received by the SMF entity.

S104. The UE receives the first message sent by the AMF entity.

S105. The UE re-establishes or modifies the first PDU session based on the first message.

It should be noted that the first message may be one of trigger conditions for re-establishing or modifying the first PDU session by the UE. The UE may alternatively re-establish or modify the first PDU session based on the first message and another condition. For example, the UE needs to determine whether an SSC mode of the first PDU session is a first session mode or a second session mode. The another condition is not specifically described or limited in the present invention.

In the session management method provided in this embodiment of the present invention, the UE sends the service request message to the AMF entity, and then the AMF entity sends, to the UE, the first message used to determine to re-establish the first PDU session. In this way, the first PDU session needs to be re-established before data needs to be transmitted or received, so as to ensure that data that needs to be transmitted or received subsequently is not lost.

Optionally, in an aspect, the first message in this embodiment of the present invention is a service accept (Service Accept) message sent by the AMF entity to the UE. The service accept message carries an identifier of the first PDU session and a first indication, the identifier is used to identify the first PDU session, and the first indication is used to instruct to re-establish or modify the PDU session. It may be understood that the first identifier and the first indication are combined and are used by the UE to determine to re-establish or modify the first PDU session. Alternatively, the service accept message carries an identifier of the first PDU session, and the UE determines, based on the identifier and with reference to a status of the first PDU session or a configuration of a DRB, to re-establish the first PDU session. For example, the service accept message carries the identifier of the first PDU session, and a PDU session status carried in the service accept message indicates that a status, of the first PDU session, on a core network side is "unavailable". In this case, the UE determines, based on the identifier of the first PDU session and the state of the first PDU session, to re-establish the first PDU session. Alternatively, the service accept message carries an identifier of the first PDU session, and a radio resource control (Radio Resource Control, RRC) reconfiguration message received by the UE does not include a DRB configuration corresponding to the first PDU session. In this case, the UE determines to re-establish or modify the first PDU session.

Alternatively, the service accept message carries only a first indication, and the first indication is used to instruct to re-establish or modify a PDU session that the UE requests to activate. In this case, correspondingly, the UE adds, to a service request message, an identifier of a session that needs to be activated, and a core network determines, based on the location of the UE, that sessions corresponding to all identifiers need to be re-established or modified.

In another aspect, the first message in this embodiment of the present invention is a service reject message sent by the AMF entity to the UE. The service reject message carries an identifier of the first PDU session and a cause value, the identifier is used to identify the first PDU session, and the cause value indicates that the UE moves out of an area corresponding to a PDU session. It may be understood that the cause value essentially indicates that the location of the UE is outside the area corresponding to the first PDU session associated with the identifier. Certainly, the service reject message in this embodiment of the present invention may alternatively carry only a cause value, and in this case, the cause value is used to instruct to re-establish or modify a PDU session that the UE requests to activate.

The identifier of the first PDU session is not limited in this embodiment of the present invention, provided that the identifier can uniquely identify the first PDU session.

Content carried in the first message is different due to different types of the first message. For different first message types and message content, step S105 in this embodiment of the present invention is also different. Therefore, details are described below in detail.

In an aspect, when the first message carries the identifier of the first PDU session and the first indication, step S105 may be specifically implemented in the following manner:

S1051a. If the first indication is used to instruct to re-establish the first PDU session, the UE determines, based on the identifier and the first indication, to re-establish the first PDU session.

S1051b. If the first indication is used to instruct to modify the first PDU session, the UE determines, based on the identifier and the first indication, to modify the first PDU session.

In another aspect, when the first message carries the identifier of the first PDU session, step S105 may be specifically implemented in the following manner:

S1051c. The UE determines, based on the identifier of the first PDU session, to re-establish or modify the first PDU session.

In still another aspect, when the first message is the service reject message, and the service reject message carries the identifier of the first PDU session and the cause value, step S105 may be specifically implemented in the following manner:

S1051d. The UE determines, based on the identifier and the cause value, to re-establish or modify the first PDU session associated with the identifier.

It may be understood that, in this embodiment of the present invention, after step S105, the method provided in this embodiment of the present invention further includes the following step:

S106. The UE sends a second message to an SMF entity, where the second message is used to request to re-establish or modify the first PDU session.

Optionally, step S106 in this embodiment of the present invention may be specifically implemented in the following manner.

If the first message sent by the AMF entity is used to instruct the UE to re-establish the first PDU session, the UE sends, to the SMF entity by using the AMF entity, a second message used to re-establish the first PDU session. The second message may be a PDU session establishment request (PDU session establishment request) message.

If the first message sent by the AMF entity is used to instruct the UE to modify the first PDU session, the UE sends, to the SMF entity by using the AMF entity, a second message used to modify the first PDU session. The second message may be a PDU session modification request (PDU session modification request) message. Alternatively, after receiving the first message used to modify the first PDU session, the UE waits for a PDU session modification command (PDU session modification command) sent by the SMF entity. If the UE does not receive the PDU session modification command sent by the SMF entity, the UE sends, to the AMF entity, the second message used to modify the first PDU session. (For example, the UE sets a timer, and sends a PDU session modification request if the UE does not receive the PDU session modification command when the timer expires.)

It may be understood that, after step S106, the method provided in this embodiment of the present invention further includes the following step:

S107. The SMF entity selects, based on the second message (a PDU session establishment request), a second UPF entity, to establish a second PDU session with the UE; or selects, based on the second message (a PDU session modification request), a second UPF entity to serve the first PDU session, and at the same time, updates an IP address, a QoS flow template (a packet filter and a priority), and the like that are corresponding to the second UPF entity.

In this case, in step S107, the SMF entity may establish the second PDU session based on the first session mode, or establish the second PDU session based on the second session mode. This is not limited in this embodiment of the present invention.

In this embodiment of the present invention, after the AMF entity receives the service request message sent by the user equipment, the AMF entity may perform UPF relocation (to be specific, the AMF entity directly sends, to the UE, an indication used to re-establish the first PDU session, such as the first message), or the SMF entity may perform UPF relocation (to be specific, when the SMF entity determines that the UE moves out of the area corresponding to the first PDU session or determines that the UE moves out of the service area of the UPF entity corresponding to the first PDU session, the SMF entity sends, to the AMF entity, a parameter used to re-establish the first PDU session, and then the AMF entity encapsulates the parameter used to re-establish the first PDU session and then sends an encapsulated parameter to the UE).

For example, the AMF entity may perform UPF relocation in the following manner:

After receiving the service request message sent by the UE, the AMF entity may directly determine, based on a relationship between the location information of the UE and the area corresponding to the first PDU session, whether to send the first message to the UE (It may be understood that, in this case, the AMF entity needs to store at least the area corresponding to the first PDU session. An implementation of obtaining, by the AMF entity, the area corresponding to the first PDU session is as follows: When the first PDU session is established or activated, the SMF entity sends, to the AMF entity, the area corresponding to the first PDU session; or after the first PDU session is established or activated, when the SMF entity subscribes to mobility event notification of the UE from the AMF entity, the SMF entity provides, for the AMF entity, the area corresponding to the first PDU session. The area may be the UPF service area of the UPF entity corresponding to the first PDU session, or may be a subset of a UPF service area using the location of the UE as a center. Another implementation of obtaining, by the AMF entity, the area corresponding to the first PDU session is as follows: When the first PDU session is established or activated, the SMF entity sends an identifier of a selected UPF entity to the AMF entity, and the AMF entity obtains a UPF service area based on the identifier of the UPF entity and a network topology structure. Specifically, the AMF entity sends the first message to the UE when determining that the location of the UE is outside the area corresponding to the first PDU session; or when determining that the location of the UE is outside the area corresponding to the first PDU session, the AMF entity sends, to the SMF entity, the location of the UE and/or an indication indicating that the location of the UE moves out of the area corresponding to the first PDU session.).

For example, the SMF entity may perform UPF relocation in the following manner:

When determining that the UE moves out of the area corresponding to the first PDU session, the AMF entity sends, to the SMF entity, the location information of the UE and/or indication information. The indication information is used to indicate that the UE moves out of the area corresponding to the PDU session. It may be understood that, the AMF entity further needs to provide, for the SMF entity, the identifier of the first PDU session, so that the SMF entity determines, based on the identifier and the indication information, that the UE moves out of the area corresponding to the first PDU session.

Alternatively, the AMF entity obtains the location information of the UE after receiving the service request message sent by the UE. In this case, the AMF entity directly sends the location information of the UE to the SMF entity. After the SMF entity receives the location information of the UE and/or the indication information, the SMF entity determines whether the location of the UE is outside the area corresponding to the first PDU session or is outside the service area of the UPF entity corresponding to the first PDU session, and the SMF entity sends a first parameter to the AMF entity when determining that the location of the UE is outside the area corresponding to the first PDU session or is outside the service area of the UPF entity corresponding to the first PDU session. The first parameter includes the identifier of the first PDU session and the first indication, or the first parameter includes the identifier of the first PDU session and the cause value. The SMF entity may directly send the first parameter to the AMF entity, or the SMF entity may encapsulate the first parameter as N1 SM information, and then sends the NI SM information to the AMF entity. For the first parameter directly sent by the SMF entity to the AMF entity, the AMF entity encapsulates the first parameter into a service accept message or encapsulates the identifier of the first PDU session and the cause value into a service reject message, and then sends the service accept message or the service reject message to the UE. For the manner in which the SMF entity sends the first parameter to the AMF entity by using the N1 SM information, the AMF entity directly encapsulates the received N1 SM information into a service accept message or a service reject message, and sends the service accept message or the service reject message to UE. It may be understood that, the first parameter may be encapsulated by the SMF entity and then be transparently transmitted by the AMF entity to the UE, or may be sent by the SMF entity to the AMF entity and then be sent by the AMF entity to the UE.

Figure 9A:
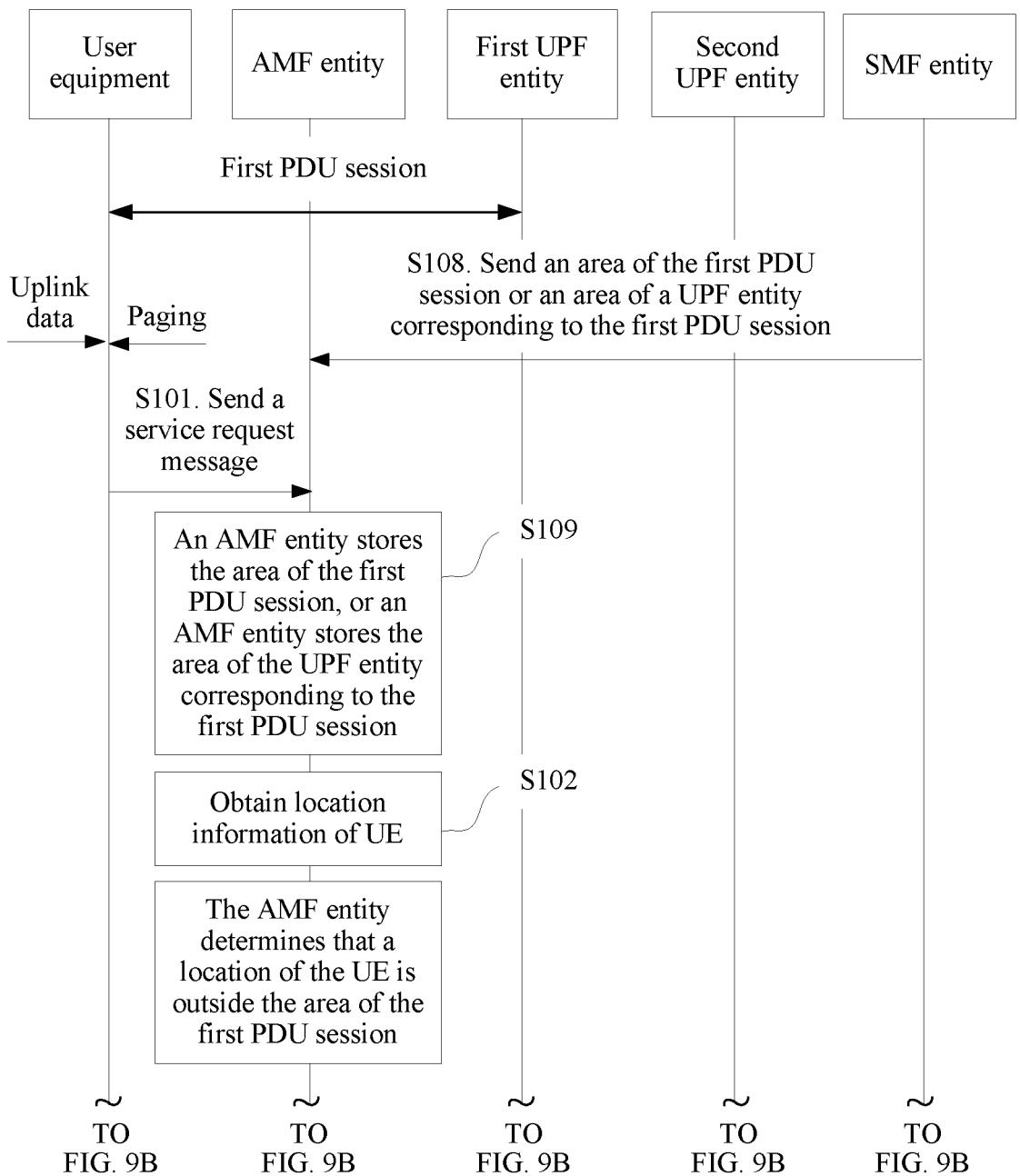
FIG. 9A and FIG. 9B are a second schematic flowchart of a session management method according to an embodiment of the present invention.

In this embodiment of the present invention, in a scenario in which the AMF entity determines that there is a need to perform UPF entity relocation, with reference to FIG. 8, as shown in FIG. 9A, before step S102, the method provided in this embodiment of the present invention further includes the following steps.

S108. The SMF entity sends, to the AMF entity, the area corresponding to the first PDU session, or the SMF entity sends, to the AMF entity, a service area of a UPF entity corresponding to the first PDU session, where the service area of the UPF entity includes at least the area corresponding to the first PDU session or an identifier of a UPF entity selected for the first PDU session.

It may be understood that, when the AMF entity receives the service area of the UPF entity corresponding to the first PDU session, the AMF entity may determine, from the service area of the UPF entity, the area corresponding to the first PDU session. In this way, the AMF entity may determine, based on the location of the UE, whether the UE is outside the area corresponding to the first PDU session.

S109. The AMF entity stores the area corresponding to the first PDU session, or the AMF entity stores the service area of the UPF entity corresponding to the first PDU session.

Figure 9B:
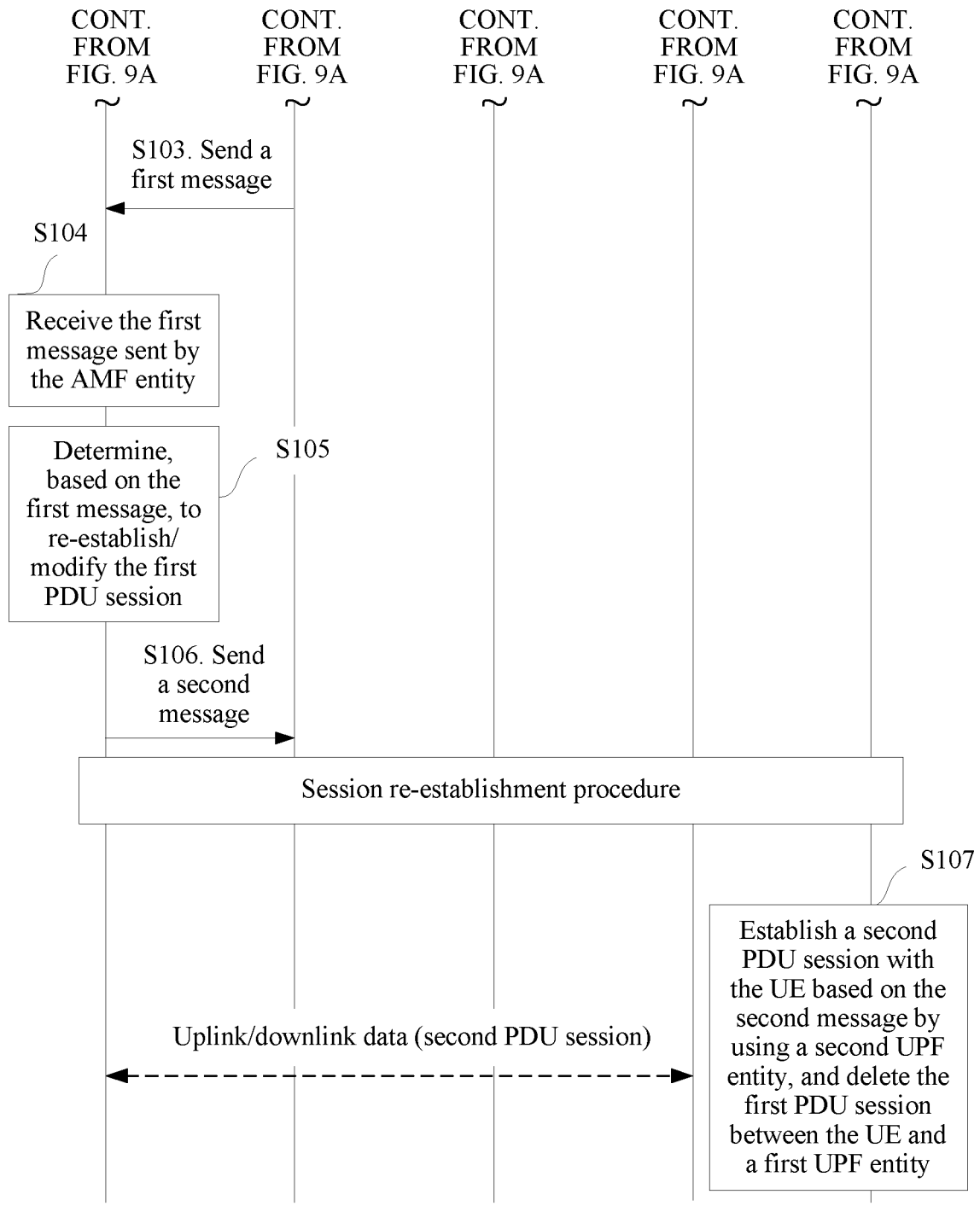
Figure 10A:
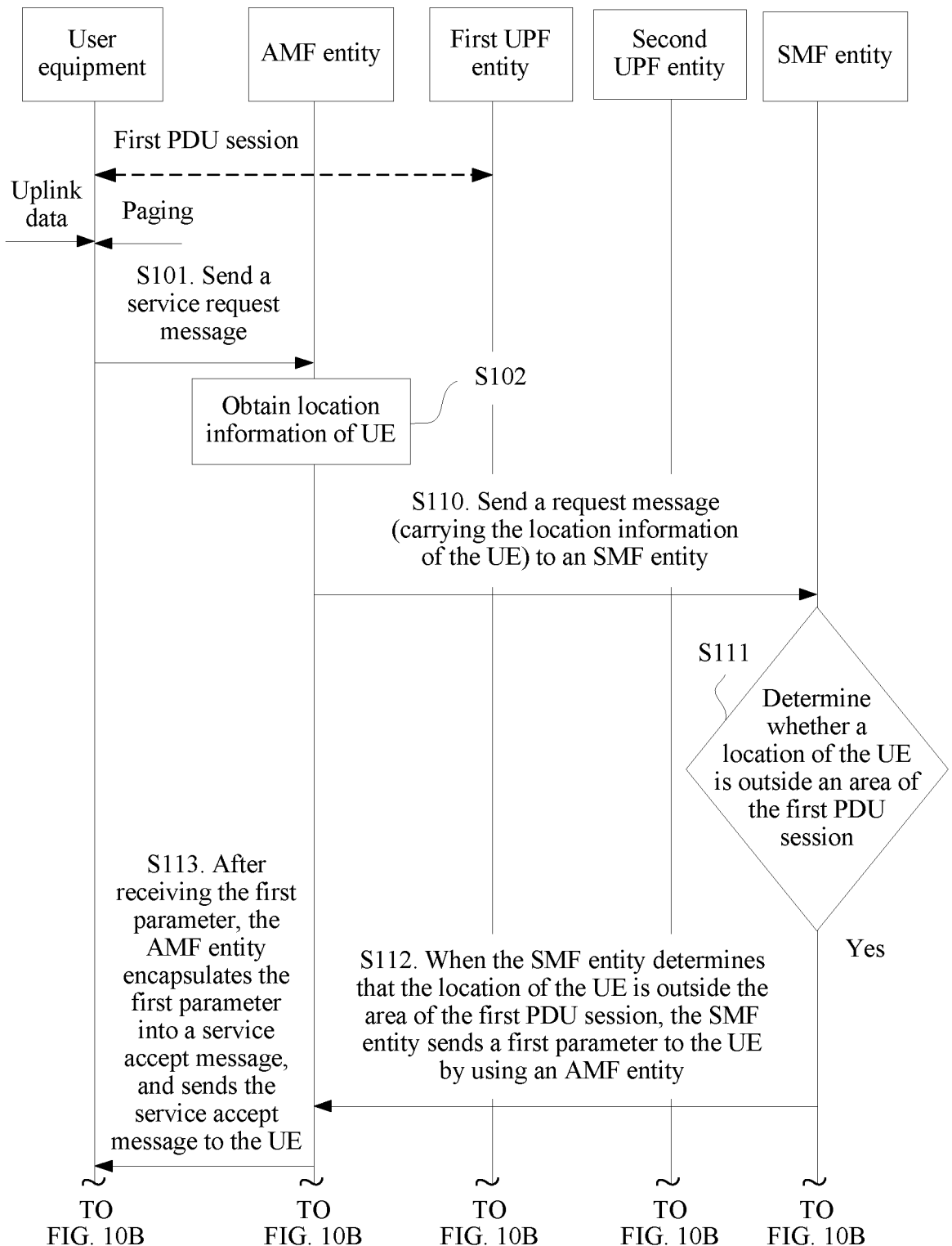
FIG. 10A and FIG. 10B are a third schematic flowchart of a session management method according to an embodiment of the present invention.
Figure 10B:
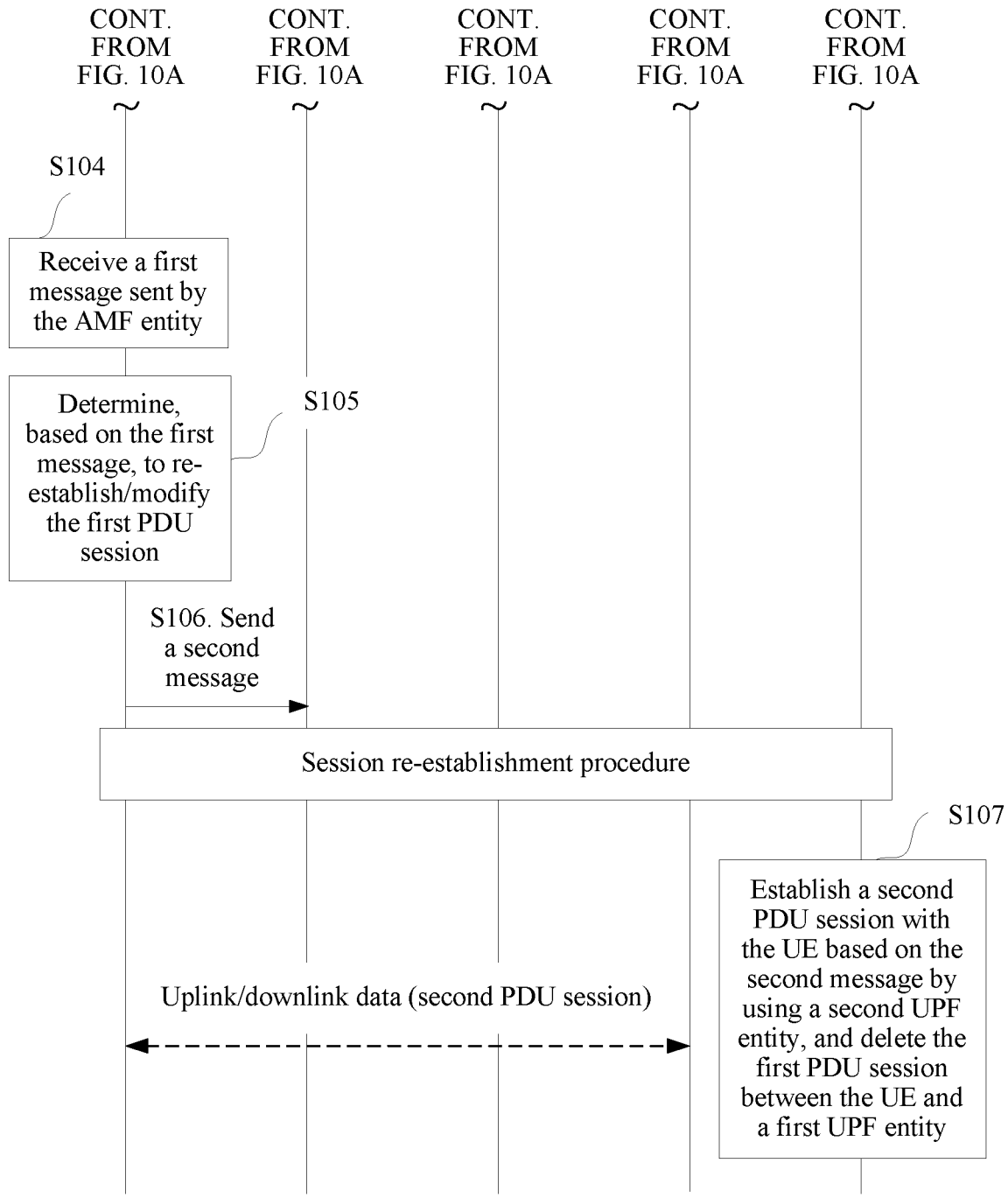

As shown in FIG. 10A and FIG. 10B, FIG. 10A and FIG. 10B show another implementation of a session management method. A difference between FIG. 10A and FIG. 10B and each of FIG. 8, and FIG. 9A and FIG. 9B lies in that in FIG. 8 and FIG. 9A and FIG. 9B, the AMF entity performs UPF entity relocation, but in FIG. 10A and FIG. 10B, the SMF entity performs UPF entity relocation.

Correspondingly, step S103 may be further implemented in the following manner:

S110. The AMF entity sends a request message to the SMF entity, where the request message may be used by the SMF entity to determine whether the location of the UE is outside the area corresponding to the first PDU session.

Optionally, the request message carries the location information of the UE or carries a second indication. The second indication is used to indicate whether the location of the UE is outside the area corresponding to the first PDU session.

S111. The SMF entity determines, based on the request message, whether the location of the UE is outside a service area of the UPF entity corresponding to the first PDU session, and performs S112 if the location of the UE is outside the service area of the UPF entity corresponding to the first PDU session.

S112. When the SMF entity determines that the location of the UE is outside the service area of the UPF entity corresponding to the first PDU session, the SMF entity sends a first parameter to the UE by using the AMF entity, where the first parameter is used to instruct to re-establish or modify the first PDU session.

Optionally, the first parameter includes the identifier of the first PDU session and the first indication, the identifier is used to identify the first PDU session, and the first indication is used to instruct the UE to re-establish or modify a PDU session.

Optionally, step S112 may be further specifically implemented in the following manner:

S112a. The SMF entity determines a session continuity mode of the first PDU session.

S112b. When the SMF entity determines that the session continuity mode of the first PDU session is a first session mode or a second session mode, and that the location of the UE is outside the service area of the UPF entity corresponding to the first PDU session, the SMF entity sends the first parameter to the UE by using the AMF entity.

S113. After receiving the first parameter, the AMF entity encapsulates the first parameter into a service accept message, and sends the service accept message to the UE.

Figure 11A:
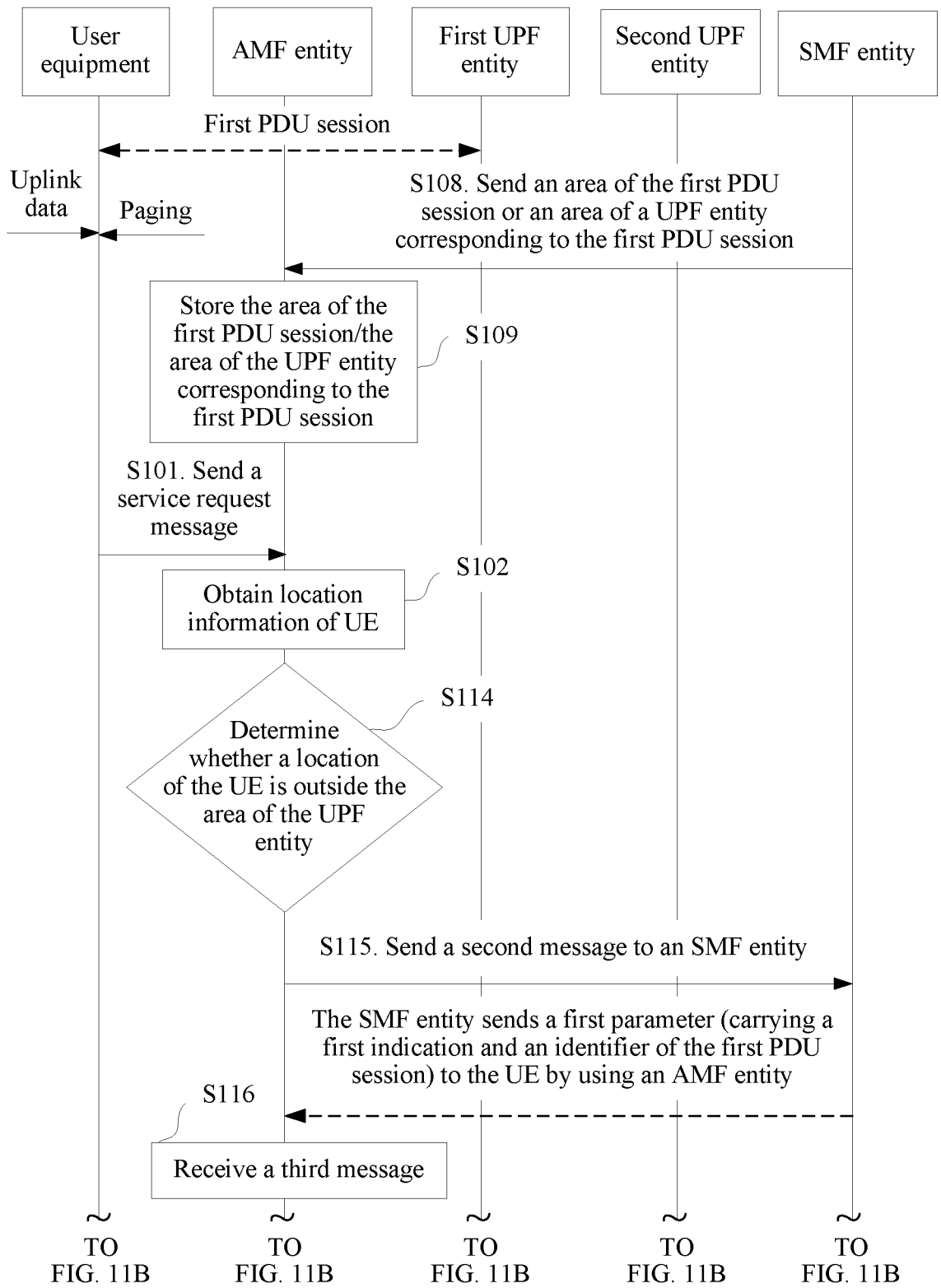
FIG. 11A and FIG. 11B are a fourth schematic flowchart of a session management method according to an embodiment of the present invention.
Figure 11B:
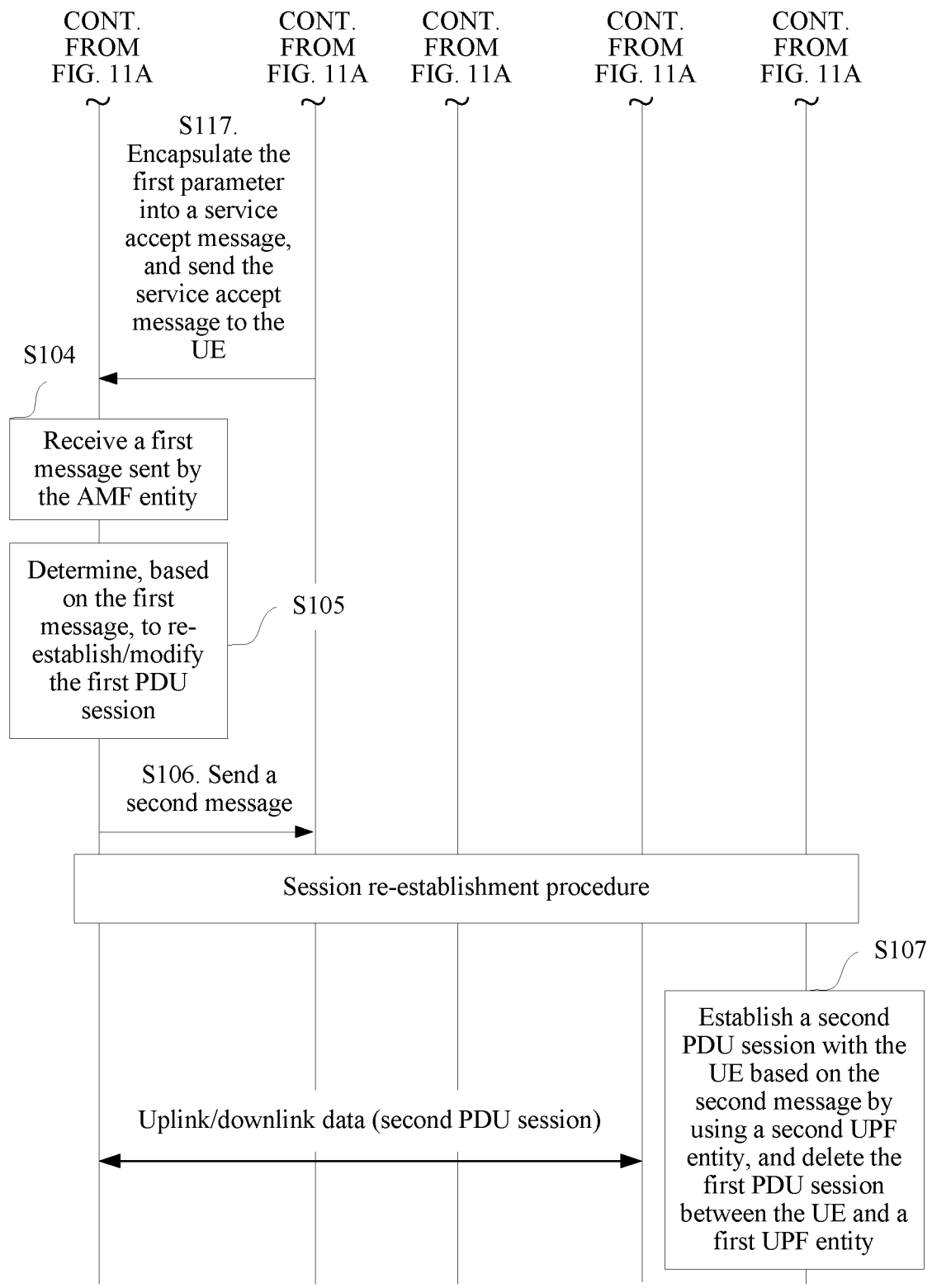

Correspondingly, as shown in FIG. 11A, step S103 may be alternatively implemented in the following manner:

S114. The AMF entity determines whether the location of the UE is outside the area corresponding to the first PDU session, and performs S115 if the location of the UE is outside the area corresponding to the first PDU session.

S115. The AMF entity sends a second message to the SMF entity when determining that the location of the UE is outside the area corresponding to the first PDU session, where the second message is used to trigger the SMF entity to send a third message.

Optionally, the second message carries the location information of the UE or a second indication. The second indication is used to indicate that the location of the UE is outside the area corresponding to the first PDU session.

S116. The AMF entity receives the third message sent by the SMF entity, where the third message carries an identifier of the first PDU session and a first indication.

S117. The AMF entity encapsulates the identifier of the first PDU session and the first indication as the first message, and then sends the first message to the UE.

It may be learned through comparison between FIG. 11A and FIG. 11B and FIG. 10A and FIG. 10B that, a difference between FIG. 11A and FIG. 11B and FIG. 10A and FIG. 10B lies in the following: In FIG. 10A and FIG. 10B, the AMF entity only sends the location information of the UE to the SMF entity, and the SMF entity determines whether the location of the UE is outside the area corresponding to the first PDU session. However, in FIG. 11A and FIG. 11B, the AMF entity sends a trigger message to the SMF entity after determining, based on the location of the UE and the area that is corresponding to the first PDU session and that is stored in the AMF entity or the service area that is of the UPF entity corresponding to the first PDU session and that is stored in the AMF entity, that the location of the UE is outside the area corresponding to the first PDU session; and in this case, the SMF entity can directly send the third message to the AMF entity without determining whether the location of the UE is outside the area corresponding to the first PDU session.

It should be noted that, in the embodiment shown in FIG. 11A, the SMF entity needs to perform S108 before step S103. However, in the embodiment shown in FIG. 10A, steps S108 and S109 may be omitted.

It may be understood that, in the session management method shown in FIG. 8 to FIG. 11A and FIG. 11B, before S101 is performed, the first PDU session is established between the UE and the SMF entity by using the first UPF entity.

In the foregoing embodiment, it is described that a UPF entity relocation process is triggered by using the AMF entity and the SMF entity as execution bodies. It may be understood that, in an actual use process, the UPF entity relocation process may be triggered by the UE. An example in which the UE triggers UPF entity relocation is used for description in the following embodiment.

In a UPF entity relocation process triggered by the UE, the UE may trigger UPF entity relocation by using a session modification (PDU Session Modification) procedure, or trigger UPF entity relocation by using a service request (Service Request) procedure, or trigger UPF entity relocation by using a registration (Registration) procedure. In a process in which the UE interacts with the AMF entity or the SMF entity, different signaling is generated in different trigger procedures. Therefore, specific implementation processes of different trigger procedures are separately described below.

Figure 12A:
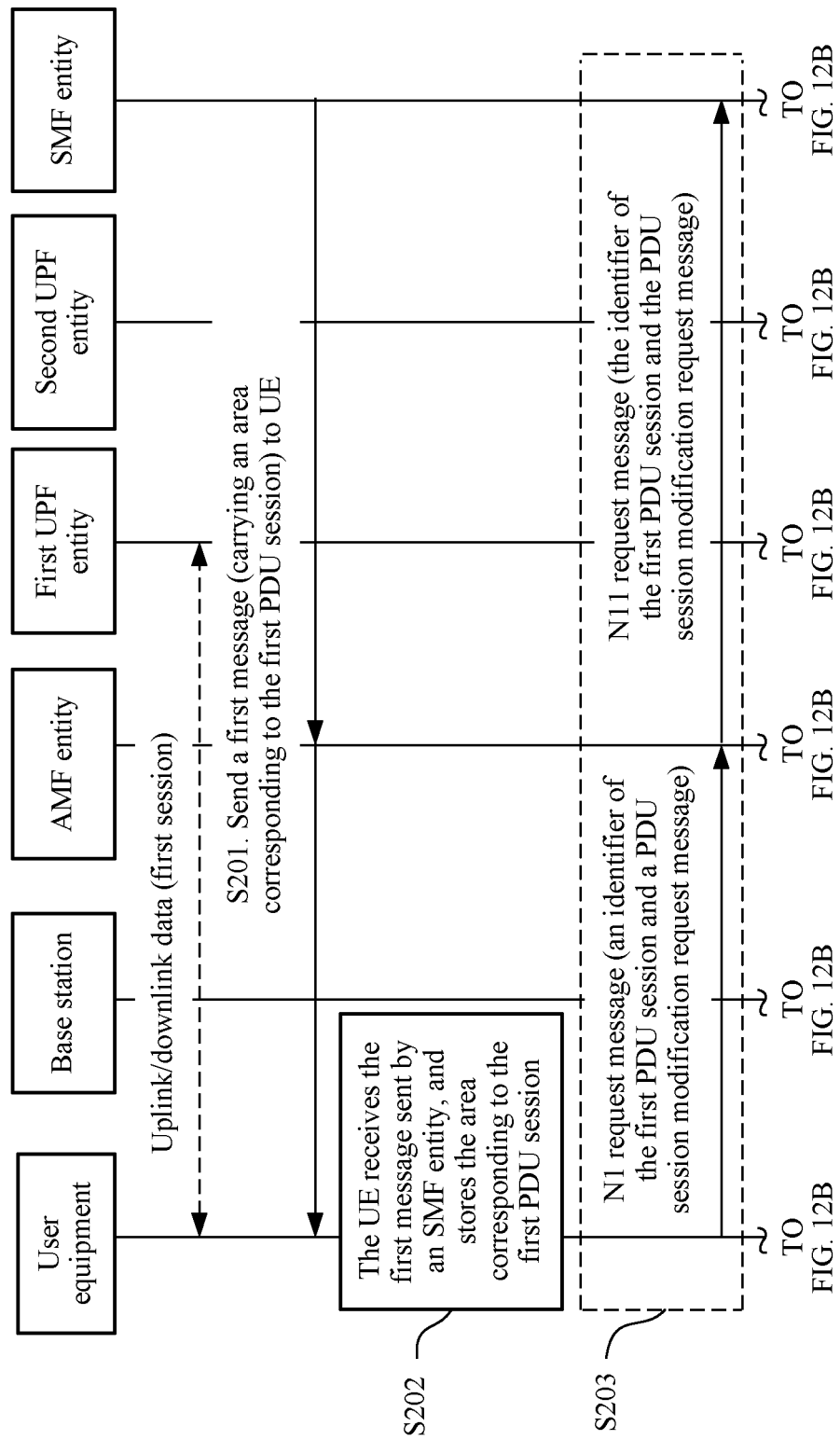
FIG. 12A, FIG. 12B, and FIG. 12C are a fourth schematic flowchart of a session management method according to an embodiment of the present invention.
Figure 12B:
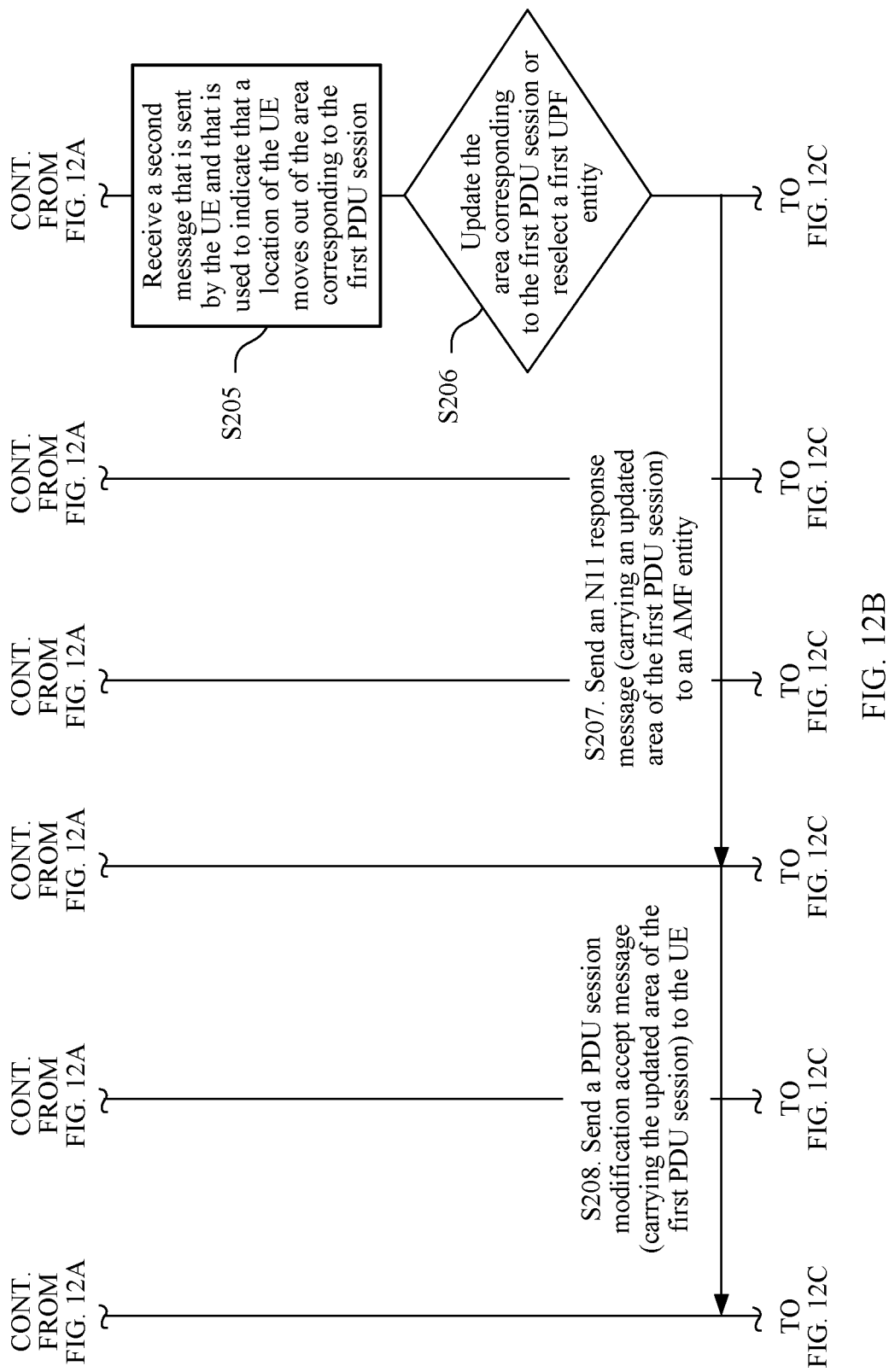
Figure 12C:
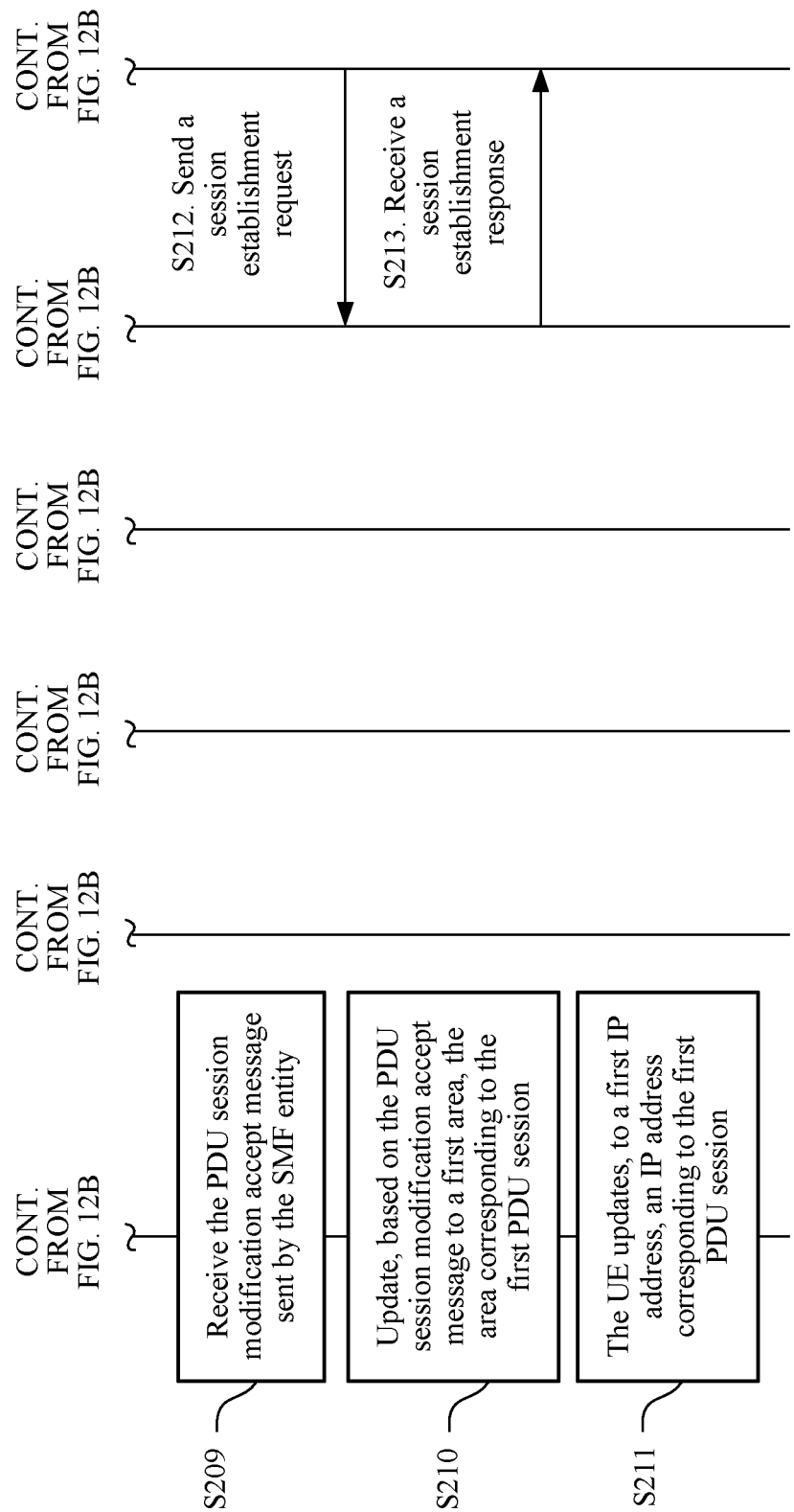

As shown in FIG. 12A, FIG. 12B, and FIG. 12C, FIG. 12A, FIG. 12B, and FIG. 12C show another session management method according to an embodiment of the present invention by using an example in which UE triggers UPF entity relocation by using a session modification procedure and a target entity is an SMF entity. The method includes the following steps.

S201. In a process in which the user equipment UE establishes a first protocol data unit PDU session, the SMF entity sends a first message to the UE, where the first message includes an area corresponding to the first PDU session.

It may be understood that, the first message including the area corresponding to the first PDU session is forwarded to the UE by the SMF entity by using an AMF entity.

Optionally, the first message carries at least the area corresponding to the first PDU session.

Optionally, the area corresponding to the first PDU session may include the following cases: a service area of a UPF entity corresponding to the first PDU session; a partial area selected by using a location of the UE as a center from a service area of a UPF entity corresponding to the first PDU session; an area generated by the SMF entity with reference to a service area of a UPF entity corresponding to the first PDU session and a service area of an adjacent UPF entity having a same function as the UPF entity; an area determined by the SMF entity with reference to a registration (registration) area and a service area of a UPF entity, where the registration area is allocated by the AMF entity to the UE and received by the SMF entity, for example, an intersection set of the registration area and the service area of the UPF entity or a subset of an intersection set of the registration area and the service area of the UPF entity is selected as the area corresponding to the first PDU session; or an area that is corresponding to the first PDU session and that is generated by the SMF entity with reference to a registration area, a service area of a selected UPF entity, and a service area of an adjacent UPF entity having a same function as the UPF entity, where the registration area is allocated by the AMF entity to the UE and received by the SMF entity.

S202. The UE receives the first message sent by the SMF entity, and stores the area corresponding to the first PDU session, where the first message includes the area corresponding to the first PDU session.

S203. When the UE moves out of the area corresponding to the first PDU session, the UE sends a second message to the SMF entity, where the second message is used to indicate that a location of the UE is outside the area corresponding to the first PDU session, that is, the UE moves out of the area corresponding to the first PDU session.

It should be noted that, that the UE moves out of the area corresponding to the first PDU session may be one of conditions for sending the second message by the UE. Another condition that needs to be met before the UE sends the second message is not specifically limited or described in the present invention.

For example, the second message is a PDU session modification request message sent by the UE to the SMF entity. The PDU session modification request message carries at least one of location information of the UE and a second indication. The second indication is used to indicate that the UE moves out of the area corresponding to the first PDU session.

In the session management method provided in this application, in the process in which the UE establishes the first PDU session, the SMF entity provides, for the UE, the area corresponding to the first PDU session. In this way, when the UE is in an idle state, once the UE is outside the area corresponding to the first PDU session, the UE triggers the PDU session modification request message to update the area corresponding to the first PDU session. In this process, the SMF entity performs UPF relocation. Therefore, it may be ensured that UPF entity relocation is performed before data is transmitted, so as to ensure that data is not lost.

It may be understood that, the second message sent by the UE to the SMF entity in step S203 is sent to the SMF entity by using the AMF entity. Specifically, as shown in FIG. 12A, the UE sends an N1 request message to the AMF entity. The N1 request message carries an identifier of the first PDU session and the PDU session modification request message. After receiving the N1 message, the AMF entity sends an N11 request message to the SMF entity based on the identifier of the first PDU session. The N11 request message carries the identifier of the first PDU session and the PDU session modification request message.

For example, the second message is the PDU session modification request message sent by the UE to the SMF entity. The PDU session modification request message carries at least one of location information of the UE and a second indication. The second indication is used to indicate that the UE moves out of the area corresponding to the first PDU session. It may be understood that, the UE further needs to add the identifier of the first PDU session to the PDU session modification request message. With reference to the identifier of the first PDU session and the second indication, the SMF entity can determine that the UE moves out of the area corresponding to the first PDU session.

In an aspect in this embodiment of the present invention, the UE can immediately send the second message to the SMF entity when determining that the location of the UE is outside the area corresponding to the first PDU session. In this case, if the UE is in an idle state at a current moment, the UE is immediately switched from the idle state to a connected state, and sends the second message to the SMF entity. In another aspect, when the UE determines that the location of the UE is outside the area corresponding to the first PDU session, if the UE is in an idle state in this case, the UE may not be immediately switched from the idle state to a connected state, and instead, the UE continues to keep in the idle state for a period of time based on a normal requirement, and is switched from the idle state to the connected state only when the UE needs to send data or receives network paging, and the UE sends the second message to the target entity. To be specific, that the location of the UE is outside the area corresponding to the first PDU session cannot be used as a trigger condition for entering the connected state from the idle state by the UE.

Therefore, in an implementation, the first message further includes a first indication. The first indication is used to instruct the UE to send the second message to the target entity after the UE determines that the location of the UE is outside the area corresponding to the first PDU session, and when a status of the UE is switched from an idle state to a connected state or when the UE has uplink data arriving in the first PDU session.

It may be understood that, in this embodiment of the present invention, that the UE enters a connected state from an idle state means the above descriptions: When the UE is in an idle state, the UE is not immediately switched from the idle state to a connected state, and instead, the UE continues to keep in the idle state for a period of time based on a normal requirement, and is switched from the idle state to the connected state only when the UE needs to send data or respond to paging. After entering the connected state, the UE sends the second message to perform UPF relocation.

In another implementation, the first message further includes a first indication. The first indication is used to instruct the UE to immediately send the second message to the target entity after the UE determines that the location of the UE is outside the area corresponding to the first PDU session.

It may be understood that, in this embodiment of the present invention, when the UE determines that the location of the UE is outside the area corresponding to the first PDU session, the UE may actively determine whether to immediately send the second message to the target entity or send the second message to the target entity only when the UE needs to be switched from an idle state to a connected state. When the UE actively determines to send the second message to the target message, the first indication in the first message may be omitted.

Optionally, because the UE sends the second message to the SMF entity only when the UE needs to be switched from an idle state to a connected state, the method provided in this embodiment of the present invention further includes the following step: S204. When determining that the location of the UE is outside the area corresponding to the first PDU session, the UE marks the first PDU session with a to-be-updated state, where the to-be-updated state is used to prompt the UE to send the second message to the UE when the UE is switched from an idle state to a connected state, so as to indicate that the location of the UE is outside the area corresponding to the first PDU session.

To be specific, when the UE determines that the location of the UE is outside the area corresponding to the first PDU session, if the UE is in an idle state in this case and does not need to be immediately switched to a connected state, the UE first marks the first PDU session with the to-be-updated state. In this way, the UE sends the second message to the target entity when the UE needs to be switched from the idle state to the connected state or when the UE has uplink data arriving in the first PDU session.

S205. The SMF entity receives the second message that is sent by the UE and that is used to indicate that the UE moves out of the area corresponding to the first PDU session.

S206. The SMF entity updates, based on the second message, the area corresponding to the first PDU session, or reselects a second UPF entity based on the second message to serve the first PDU session.

Optionally, the second message carries the location information of the UE, and step S206 may be specifically implemented in the following manner: If a session and service continuity mode of the first PDU session is a first session mode or a second session mode, when determining that the UE moves out of the area corresponding to the first PDU session and that the UE is inside the service area of the user plane function UPF entity corresponding to the first PDU session, the SMF entity updates the area corresponding to the first PDU session; or the SMF entity reselects a second UPF entity when determining that the UE moves out of the area corresponding to the first PDU session and that the UE moves out of the service area of the UPF entity corresponding to the first PDU session.

Optionally, in an aspect, when the SMF entity determines that there is a need to update the area corresponding to the first PDU session, after step S206, the method provided in this embodiment of the present invention further includes the following steps:

S207. The SMF entity sends an N11 response message to an AMF entity, where the N11 response message carries a first area, and the first area is an updated area of the first PDU session.

S208. The AMF entity sends a third message to the UE.

When the UE requests to trigger UPF entity relocation by using the session modification procedure, the third message is a PDU session modification accept message sent by the AMF entity to the UE.

S209. The UE receives the third message sent by the AMF entity.

S210. The UE updates, based on the third message to the first area, the area corresponding to the first PDU session.

Optionally, the UE updates, to a first QoS flow template, a flow template corresponding to a QoS flow in the first PDU session.

Optionally, after receiving a first IP address, the UE locally updates the QoS flow template. In an implementation, the UE replaces, with the first IP address, a source IP address in a packet filter in the QoS flow template.

Optionally, the N11 response message further includes a first IP address, and therefore the third message further includes the first IP address. The first IP address is an updated IP address of the first PDU session.

Optionally, the method provided in this embodiment of the present invention further includes the following step:

S211. The UE updates, to a first IP address, an IP address corresponding to the first PDU session.

In the session management method provided in this application, in the process in which the UE establishes the first PDU session, the SMF entity provides, for the UE, the area corresponding to the first PDU session. In this way, when the UE is in an idle state, once the UE is outside the area corresponding to the first PDU session, the UE triggers the PDU session modification request message to update the area corresponding to the first PDU session. In this process, the SMF entity performs UPF relocation. Therefore, it may be ensured that UPF entity relocation is performed before data is transmitted, so as to ensure that data is not lost.

Optionally, in another aspect, when the SMF entity determines that there is a need to reselect a second UPF entity, the method provided in this embodiment of the present invention further includes the following steps:

S212. The SMF entity sends a session establishment request to the second UPF entity, where the session establishment request carries an identifier of the first PDU session.

S213. The SMF entity receives a session establishment response sent by the second UPF entity.

Figure 13A:
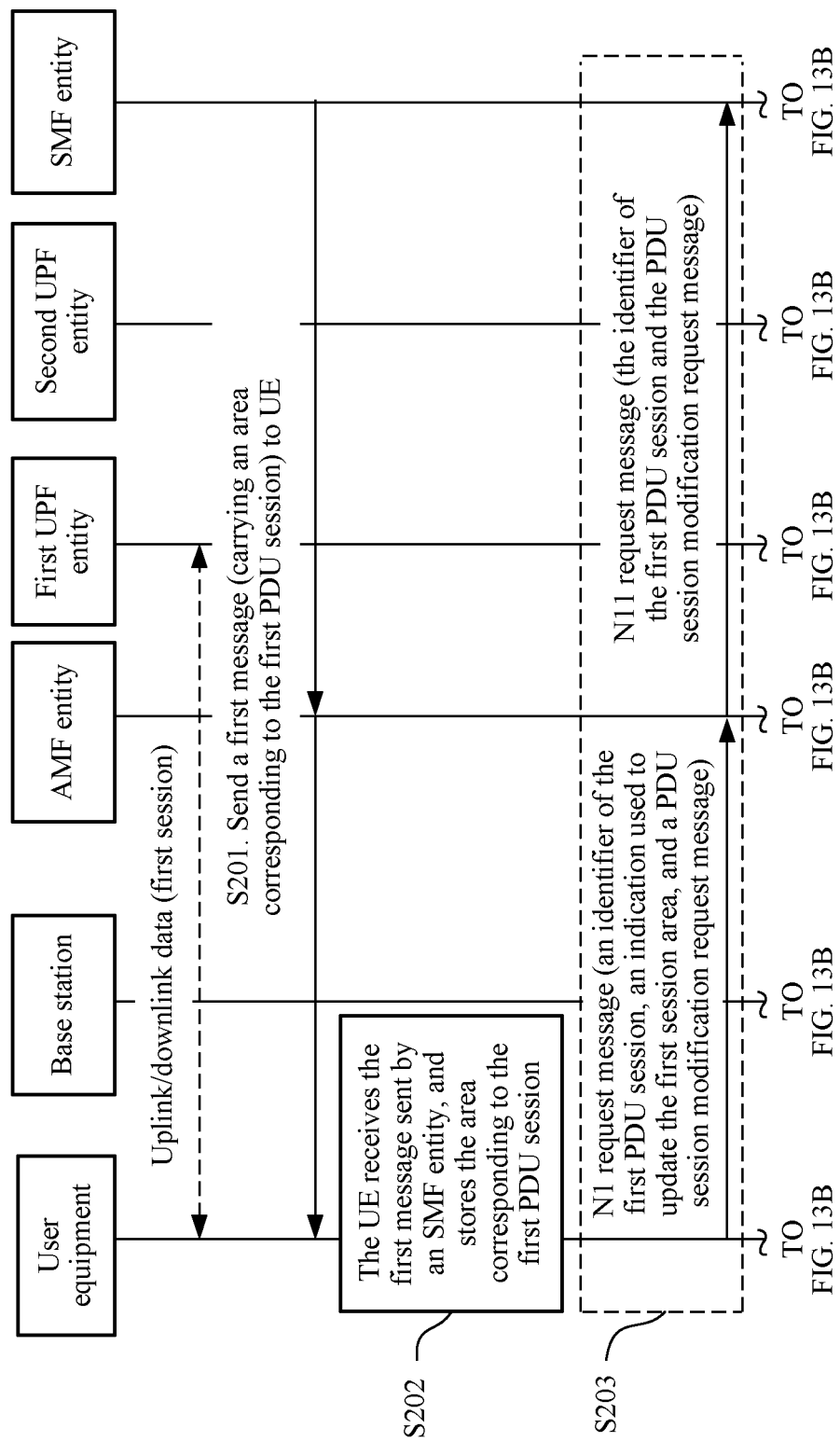
FIG. 13A, FIG. 13B, and FIG. 13C are a fifth schematic flowchart of a session management method according to an embodiment of the present invention.
Figure 13B:
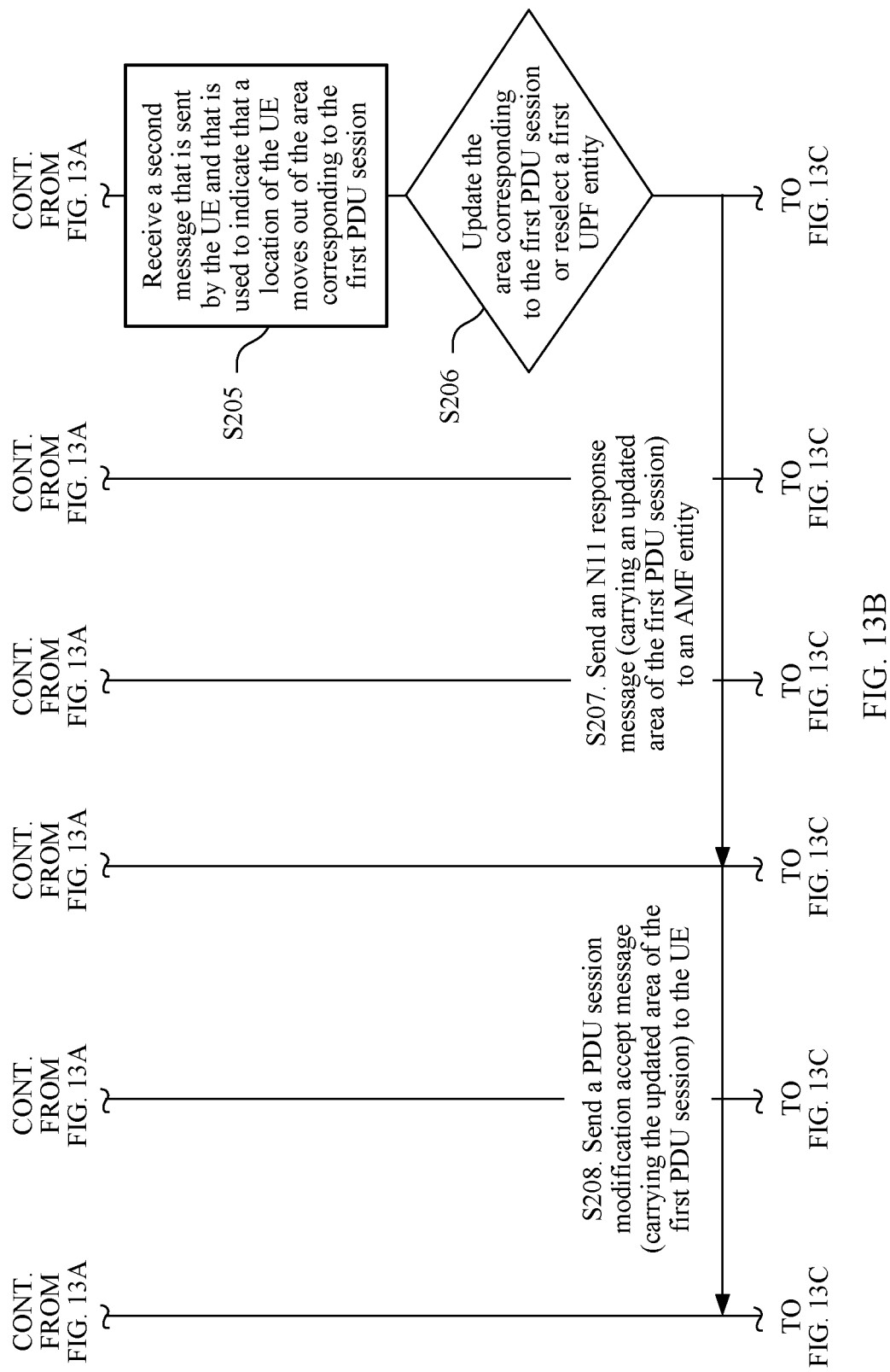
Figure 13C:
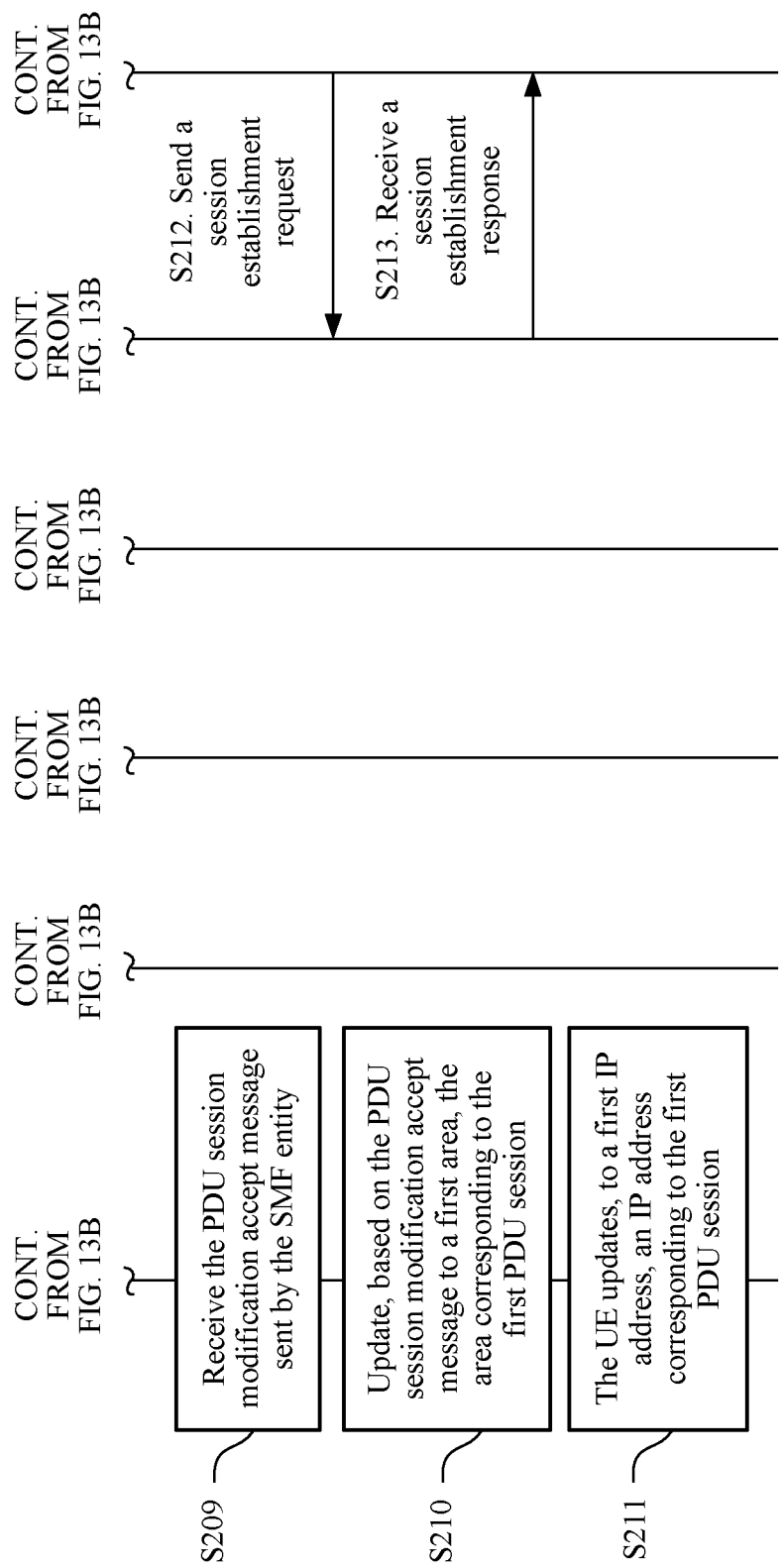

As shown in FIG. 13A, FIG. 13B, and FIG. 13C, a difference between FIG. 13A, FIG. 13B, and FIG. 13C and FIG. 12A, FIG. 12B, and FIG. 12C lies in the following: In FIG. 12A, FIG. 12B, and FIG. 12C, the N1 request message sent by the UE to the AMF entity carries the identifier of the first PDU session and the PDU session modification request message, and the PDU session modification request message includes the location information of the UE. Then, after receiving the request message, the AMF entity sends the identifier of the first PDU session and the PDU session modification request message to the SMF entity, so that the SMF entity determines, based on the location of the UE, the service area of the UPF entity corresponding to the first PDU session, and a session mode of the first PDU session, to update the area corresponding to the first PDU session or reselect a second UPF entity. However, in FIG. 13A, FIG. 13B, and FIG. 13C, the N1 request message sent by the UE to the AMF entity carries the identifier of the first PDU session, an indication used to update the first session area, and the PDU session modification request message. Then, after receiving the N1 request message sent by the UE, the AMF entity sends, to an SMF entity indicated by the identifier of the first PDU session, the location information of the UE and the PDU session modification request message based on the indication used to update the first session area (it may be understood that, the AMF entity stores a mapping relationship between an identifier of the SMF entity and the identifier of the first PDU session, and the SMF entity sends, to the AMF entity, the mapping relationship between the identifier of the SMF entity and the identifier of the first PDU session after the first PDU session is established).

In the session management method provided in this application, in the process in which the UE establishes the first PDU session with the SMF entity, the SMF entity provides, for the UE, the area corresponding to the first PDU session. In this way, when the UE is in an idle state, once the UE is outside the area corresponding to the first PDU session, the UE triggers the PDU session modification request message to update the area corresponding to the first PDU session. In this process, the SMF entity performs UPF relocation. Therefore, it may be ensured that UPF entity relocation is performed before data is transmitted, so as to ensure that data is not lost.

Figure 14A:
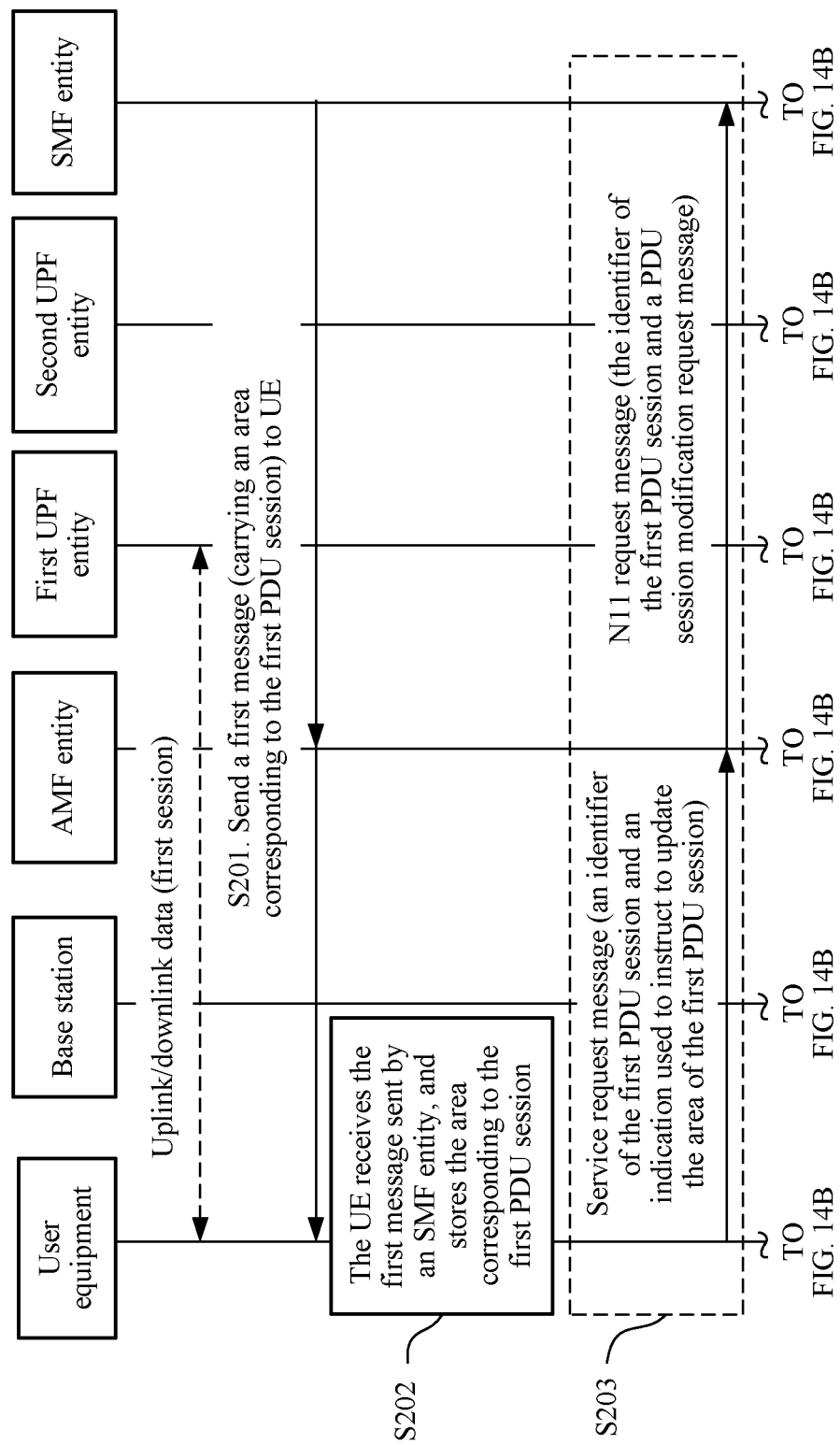
FIG. 14A, FIG. 14B, and FIG. 14C are a schematic flowchart of specific use of a session management method according to an embodiment of the present invention.
Figure 14B:
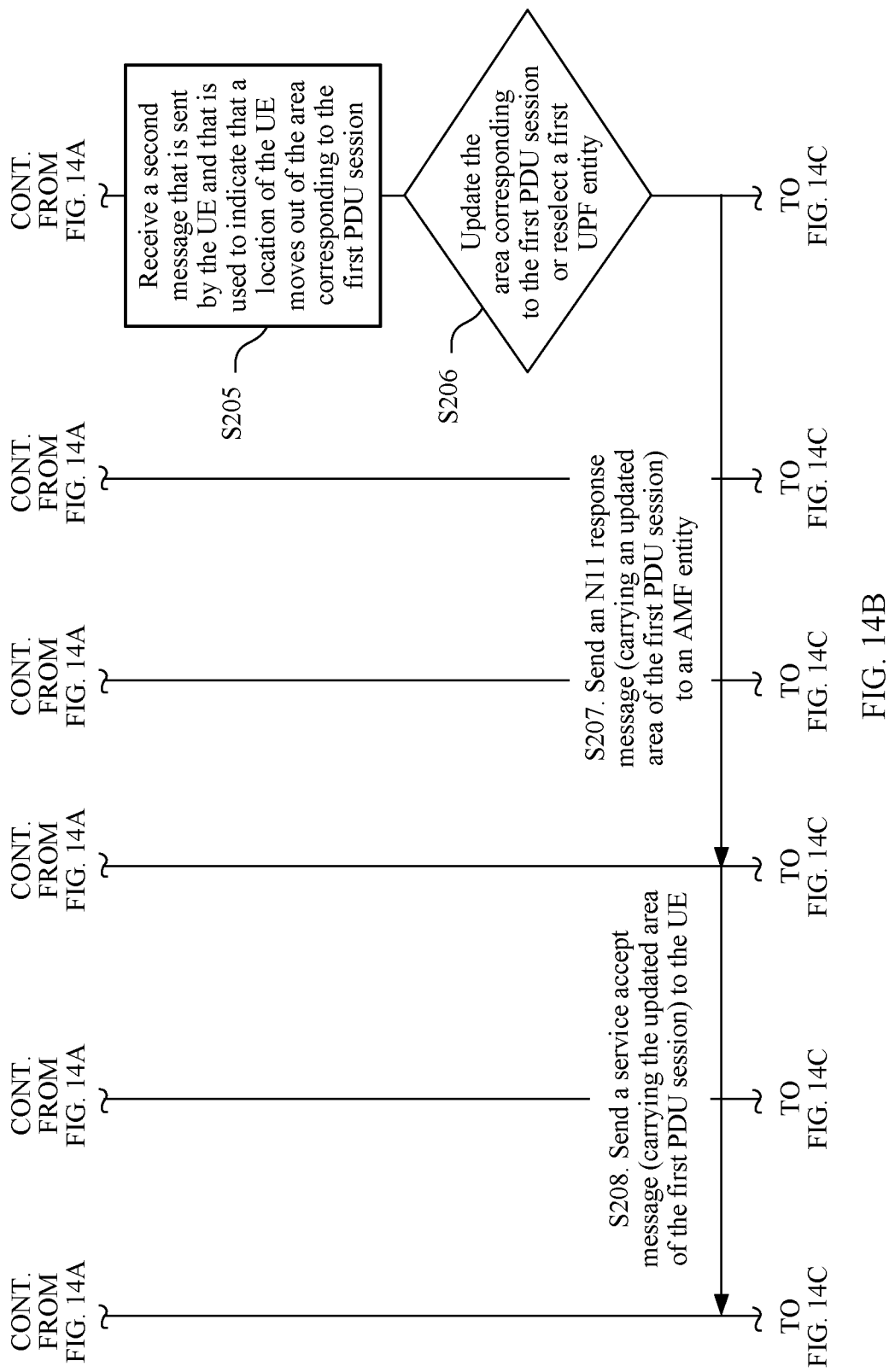
Figure 14C:
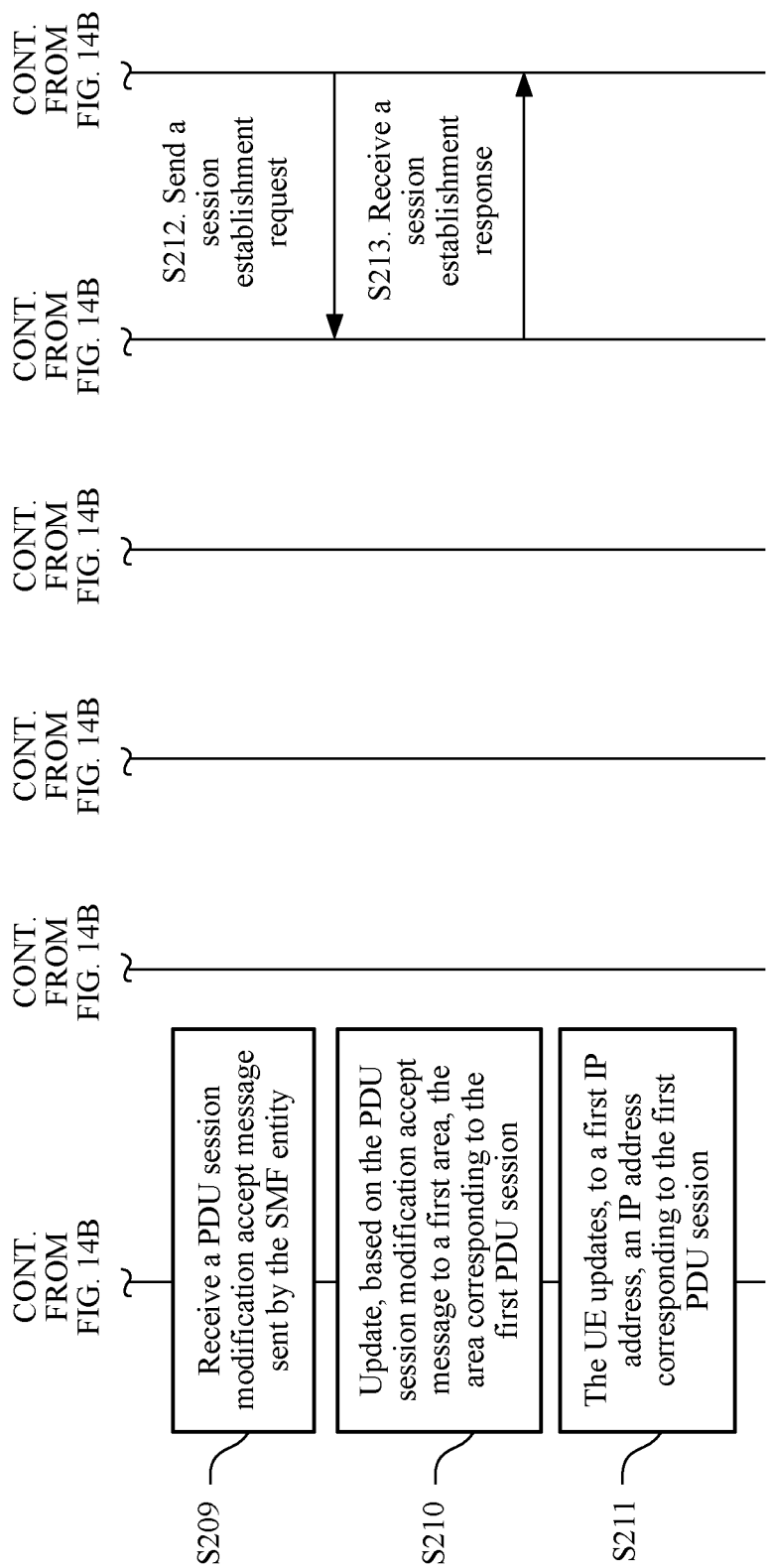

As shown in FIG. 14A, FIG. 14B, and FIG. 14C, FIG. 14A, FIG. 14B, and FIG. 14C show another session management method according to an embodiment of the present invention by using an example in which UE triggers UPF entity relocation by using a service request message procedure and a target entity is an AMF entity. Specifically, a difference between FIG. 14A, FIG. 14B, and FIG. 14C and FIG. 12A, FIG. 12B, and FIG. 12C lies in that the second message sent by the UE in step S203 is a service request message sent to the AMF entity. The service request message carries the identifier of the first PDU session and an indication used to instruct to update the area of the first PDU session. Then, the AMF entity sends, to an SMF entity indicated by the identifier of the first PDU session, the location information of the UE and the identifier of the first PDU session based on the indication used to instruct to update the area of the first PDU session.

When the UE triggers UPF entity relocation by using the service request message procedure, the third message is a service accept message sent by the AMF entity to the UE.

In the session management method provided in this application, in the process in which the UE establishes the first PDU session with the SMF entity, the SMF entity provides, for the UE, the area corresponding to the first PDU session. In this way, when the UE is in an idle state, once the UE is outside the area corresponding to the first PDU session, the UE triggers the PDU session modification request message to update the area corresponding to the first PDU session. In this process, the SMF entity performs UPF relocation. Therefore, it may be ensured that UPF entity relocation is performed before data is transmitted, so as to ensure that data is not lost.

Figure 15A:
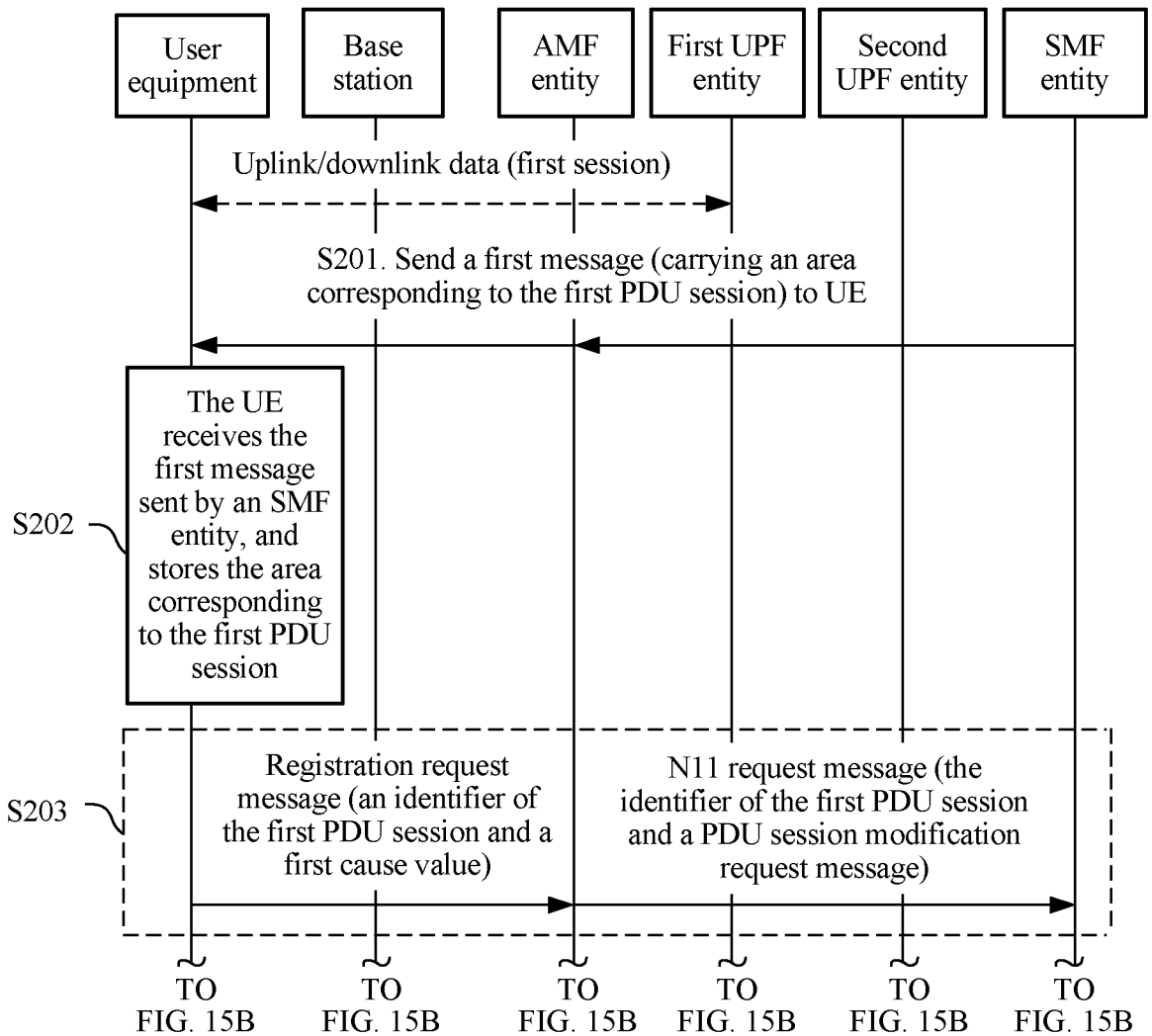
FIG. 15A, FIG. 15B, and FIG. 15C are a schematic flowchart of specific use of another session management method according to an embodiment of the present invention.
Figure 15B:
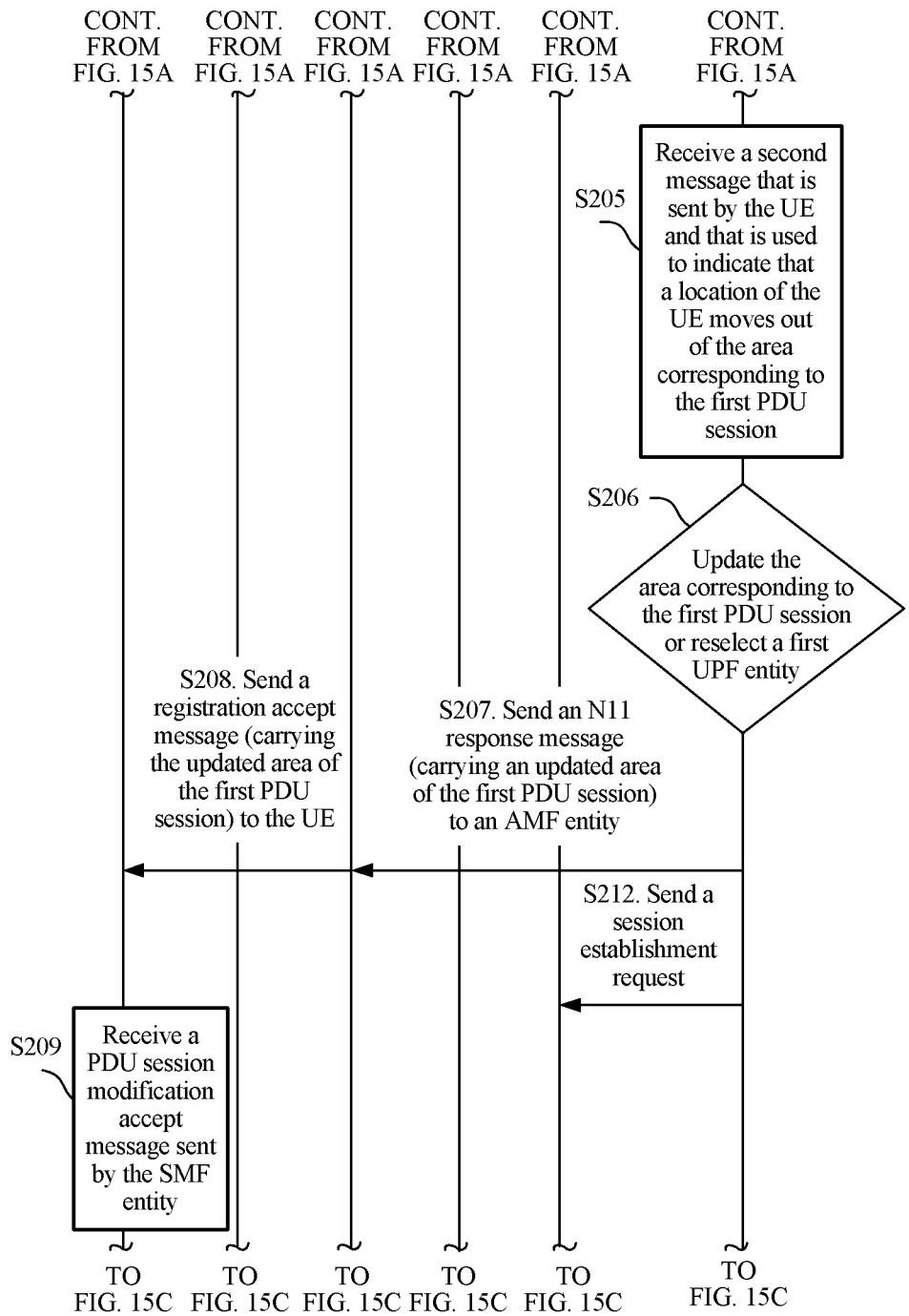
Figure 15C:
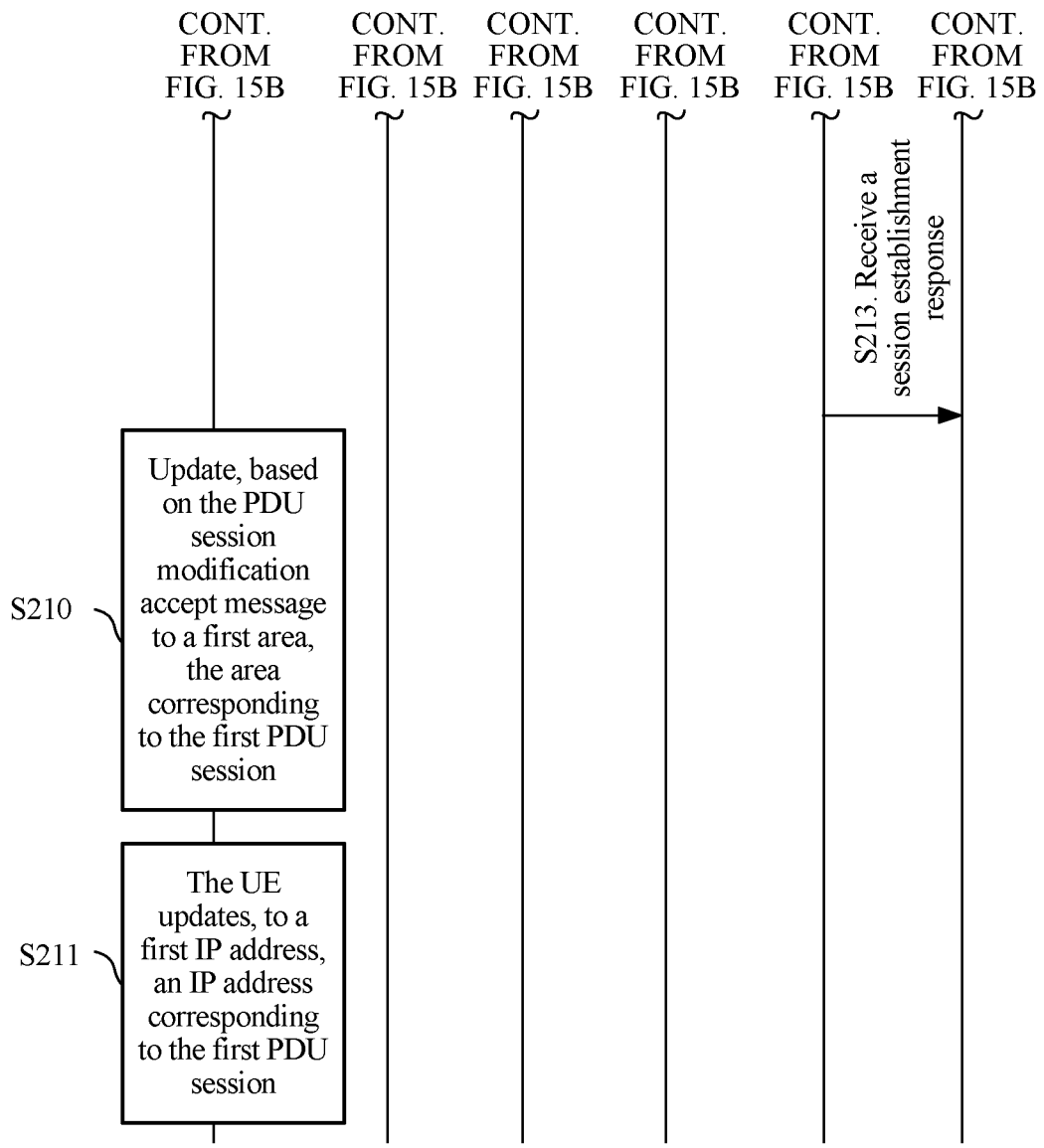

As shown in FIG. 15A, FIG. 15B, and FIG. 15C, FIG. 15A, FIG. 15B, and FIG. 15C are described by using an example in which a target entity is an AMF entity and UE triggers UPF entity relocation by using a registration procedure. A difference between an embodiment described in FIG. 15A, FIG. 15B, and FIG. 15C and that described in FIG. 14A, FIG. 14B, and FIG. 14C lies in that the second message sent by the UE to the AMF entity is a registration request message sent by the UE to the AMF entity. The registration request message carries a first cause value, and the first cause value is used to indicate that the UE moves out of the area corresponding to the first PDU session. Then, the AMF entity determines, based on the first cause value, to send the location information of the UE to the SMF entity.

It may be understood that, in this embodiment of the present invention, in order that an SMF entity that re-establishes a second PDU session is the same as the SMF entity that establishes the first PDU session, a request message or the registration request message or a service request message that is sent by the UE to the AMF entity carries the identifier of the first PDU session. In this way, it may be ensured that the AMF entity sends the location information of the UE to an SMF entity that has a mapping relationship with the first PDU session.

When the UE requests to trigger UPF entity relocation by using the registration procedure, the third message is a registration accept message sent by the AMF entity to the UE.

In the session management method provided in this application, in the process in which the UE establishes the first PDU session with the SMF entity, the SMF entity provides, for the UE, the area corresponding to the first PDU session. In this way, when the UE is in an idle state, once the UE is outside the area corresponding to the first PDU session, the UE triggers the PDU session modification request message to update the area corresponding to the first PDU session. In this process, the SMF entity performs UPF relocation. Therefore, it may be ensured that UPF entity relocation is performed before data is transmitted, so as to ensure that data is not lost.

The foregoing describes the solutions provided in this application mainly from a perspective of interaction between user equipment, an AMF entity, and an SMF entity. It may be understood that, to implement the foregoing functions, the user equipment, the AMF entity, the SMF entity, and the like include corresponding hardware structures and/or software modules for performing the functions. A person skilled in the art should be easily aware that, with reference to the user equipment, the AMF entity, the SMF entity, and method steps in the examples described in the embodiments disclosed in this specification, the present invention can be implemented in a form of hardware or a combination of hardware and computer software. Whether a function is performed in a form of hardware or hardware driven by computer software depends on particular applications and design constraint conditions of the technical solutions. A person skilled in the art may use different methods to implement the described functions for each particular application, but it should not be considered that the implementation goes beyond the scope of this application.

In the embodiments of the present invention, the user equipment, the AMF entity, the SMF entity, and the like may be divided into function modules based on the foregoing method examples. For example, each function module may be obtained through division for each corresponding function, or two or more functions may be integrated into one processing module. The integrated module may be implemented in a form of hardware, or may be implemented in a form of a software function module. It should be noted that, the module division in the embodiments of the present invention is an example, and is only logical function division. There may be another division manner in actual implementation.

Figure 16:
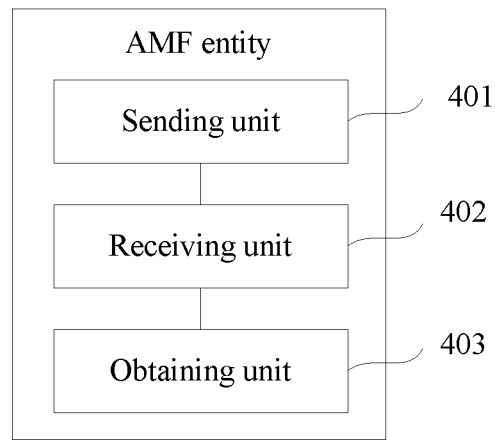
FIG. 16 is a first schematic structural diagram of an AMF entity according to an embodiment of the present invention.

When each function module is obtained through division for each corresponding function, FIG. 16 is a possible schematic structural diagram of an AMF entity used in the foregoing embodiment. An AMF entity 10 includes a sending unit 401 and a receiving unit 402. The receiving unit 402 is configured to support the AMF entity 10 in performing steps S102 and S116 in the foregoing embodiment, and the sending unit 401 is configured to support the AMF entity 10 in performing steps S103, S110, S113, S115, S117, and S208 in the foregoing embodiment. It may be understood that, the AMF entity 10 provided in this embodiment of the present invention may further include: an obtaining unit 403, configured to support the AMF entity in performing step S102 in the foregoing embodiment; and a storing unit 404, configured to support the AMF entity in performing step S109 in the foregoing embodiment. All related content of each step in the foregoing method embodiment may be cited in function descriptions of a corresponding function module, and details are not described herein.

Specifically, in hardware implementation, the receiving unit 402 may be a receiver of the AMF entity 10, and the sending unit 401 may be a transmitter of the AMF entity 10. The transmitter and the receiver may be integrated to constitute a transceiver shown in FIG. 5. The obtaining unit 403 and the storing unit 404 may be integrated into a processor of the AMF entity 10.

Figure 17:
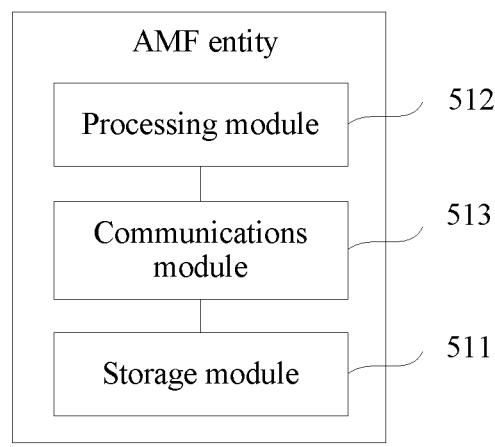
FIG. 17 is a second schematic structural diagram of an AMF entity according to an embodiment of the present invention.

When an integrated unit is used, FIG. 17 is a schematic diagram of a possible logical structure of the AMF entity 10 used in the foregoing embodiment. The AMF entity 10 includes a processing module 512 and a communications module 513. The processing module 512 is configured to control and manage an action of the AMF entity 10. For example, the processing module 512 is configured to perform steps S102 and S116, steps S103, S110, S113, S115, S117, S208, and S102, and step S109 in the foregoing embodiment, and/or is configured to perform another process of the technology described in this specification. The communications module 513 is configured to support the AMF entity 10 in communicating with user equipment and an SMF entity. The AMF entity 10 may further include a storage module 511, configured to store program code and data of the AMF entity 10.

The processing module 512 may be a processor or a controller, for example, may be a central processing unit, a general purpose processor, a digital signal processor, an application-specific integrated circuit, a field programmable gate array or another programmable logical device, a transistor logical device, a hardware component, or any combination thereof. The controller/processor may implement or execute various example logical blocks, modules, and circuits described with reference to content disclosed in the present invention. Alternatively, the processor may be a combination that implements a computing function, for example, a combination including one or more microprocessors, or a combination of a digital signal processor and a microprocessor. The communications module 513 may be a transceiver, a transceiver circuit, a transceiver, or the like. The storage module 511 may be a memory.

When the processing module 512 is a processor, the communications module 513 is a transceiver, and the storage module 511 is a memory, the AMF entity used in this embodiment of the present invention may be a device shown in FIG. 5.

Figure 18:
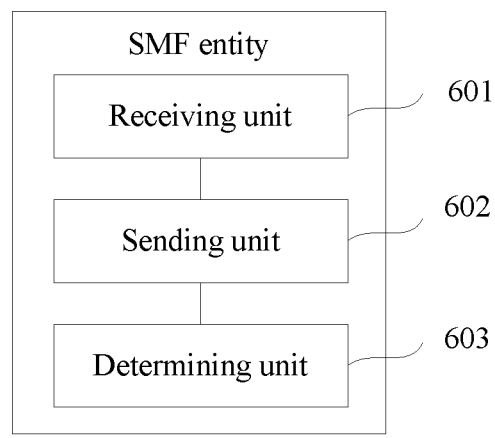
FIG. 18 is a first schematic structural diagram of an SMF entity according to an embodiment of the present invention.

When each function module is obtained through division for each corresponding function, FIG. 18 is a possible schematic structural diagram of an SMF entity used in the foregoing embodiment. An SMF entity 20 includes: a receiving unit 601, configured to receive a first message that is sent by an access and mobility management function AMF entity and that is used to instruct the SMF entity to determine whether UE moves out of an area corresponding to a first PDU session; a sending unit 602, configured to support the SMF entity in performing steps S112, S112b, and S108 in the foregoing embodiment; a determining unit 603, configured to determine a session continuity mode of the first PDU session and perform S112a; and a judging unit, configured to support the SMF entity in performing step S111 in the foregoing embodiment. All related content of each step in the foregoing method embodiment may be cited in function descriptions of a corresponding function module, and details are not described herein.

Specifically, in hardware implementation, the sending unit 601 may be a transmitter of the SMF entity, the receiving unit 602 may be a receiver of the SMF entity. The receiver and the transmitter may be integrated to constitute a transceiver of the SMF entity 20, as shown in FIG. 6. The determining unit 603 may be integrated into a processor of the SMF entity 20.

Figure 19:
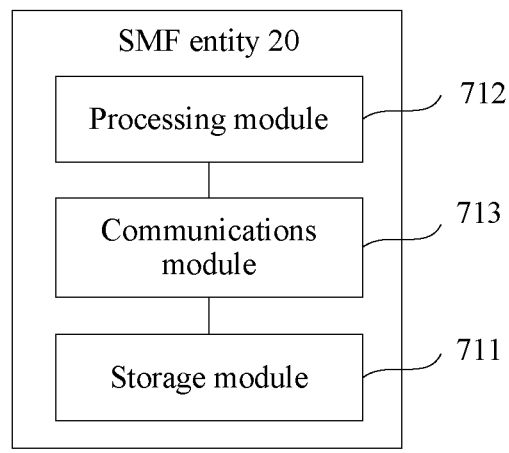
FIG. 19 is a second schematic structural diagram of an SMF entity according to an embodiment of the present invention.

When an integrated unit is used, FIG. 19 is a schematic diagram of a possible logical structure of the SMF entity 20 used in the foregoing embodiment. The SMF entity 20 includes a processing module 712 and a communications module 713. The processing module 712 is configured to control and manage an action of the SMF entity 20. For example, the processing module 712 is configured to support the SMF entity 20 in performing steps that are performed by an SMF entity in the embodiment shown in FIG. 8 to FIG. 11A and FIG. 11B. For example, the processing module 712 is configured to receive a first message that is sent by an access and mobility management function AMF entity and that is used to instruct the SMF entity to determine whether UE moves out of an area corresponding to a first PDU session, perform S108 and steps S112 and S112b, and determine a session continuity mode of the first PDU session and perform S112a, and/or is configured to perform another process of the technology described in this specification. The communications module 713 is configured to support the SMF entity 20 in communicating with the AMF entity. The SMF entity 20 may further include a storage module 711, configured to store program code and data of the SMF entity 20.

The processing module 712 may be a processor or a controller, for example, may be a central processing unit, a general purpose processor, a digital signal processor, an application-specific integrated circuit, a field programmable gate array or another programmable logical device, a transistor logical device, a hardware component, or any combination thereof. The controller/processor may implement or execute various example logical blocks, modules, and circuits described with reference to content disclosed in the present invention. Alternatively, the processor may be a combination that implements a computing function, for example, a combination including one or more microprocessors, or a combination of a digital signal processor and a microprocessor. The communications module 713 may be a transceiver, a transceiver circuit, a transceiver, or the like. The storage module 711 may be a memory.

When the processing module 712 is a processor, the communications module 713 is a transceiver, and the storage module 711 is a memory, the SMF entity used in this embodiment of the present invention may be a device shown in FIG. 6.

Figure 20:
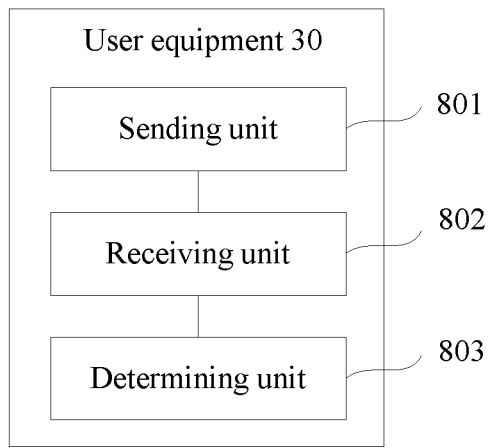
FIG. 20 is a first schematic structural diagram of user equipment according to an embodiment of the present invention.

When each function module is obtained through division for each corresponding function, FIG. 20 is a possible schematic structural diagram of user equipment used in the foregoing embodiment. User equipment 30 includes a sending unit 801, a receiving unit 802, and a determining unit 803. The sending unit 801 is configured to support the UE in performing S101 and S106 in the foregoing embodiment. The receiving unit 802 is configured to support the user equipment 30 in performing step S104 in the foregoing embodiment. The determining unit 803 is configured to support the user equipment 30 in performing step S105 in the foregoing embodiment. All related content of each step in the foregoing method embodiment may be cited in function descriptions of a corresponding function module, and details are not described herein.

Figure 21:
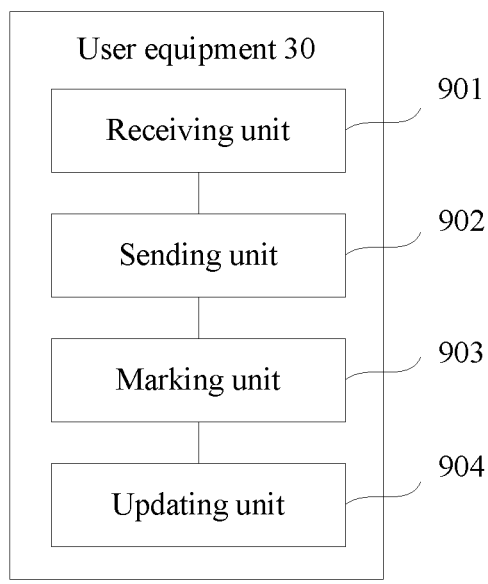
FIG. 21 is a second schematic structural diagram of user equipment according to an embodiment of the present invention.

When each function module is obtained through division for each corresponding function, FIG. 21 is a possible schematic structural diagram of user equipment used in the foregoing embodiment. User equipment 30 includes a receiving unit 901, a sending unit 902, and a marking unit 903. The receiving unit 901 is configured to support the UE in performing S202 and S209 in the foregoing embodiment. The sending unit 902 is configured to support the user equipment 30 in performing step S203 in the foregoing embodiment. The marking unit 903 is configured to support the user equipment 30 in performing step S204 in the foregoing embodiment. The user equipment further includes an updating unit 904, configured to support the user equipment in performing S210 and S211. All related content of each step in the foregoing method embodiment may be cited in function descriptions of a corresponding function module, and details are not described herein.

Specifically, in hardware implementation, the sending unit 801 and the sending unit 902 may be a transmitter of the user equipment 30, the receiving unit 802 and the receiving unit 901 may be a receiver of the user equipment 30. The receiver and the transmitter may be integrated to constitute a transceiver of the user equipment 30, as shown in FIG. 7. The updating unit 904 and the marking unit 903 may be integrated into a processor of the user equipment 30.

Figure 22:
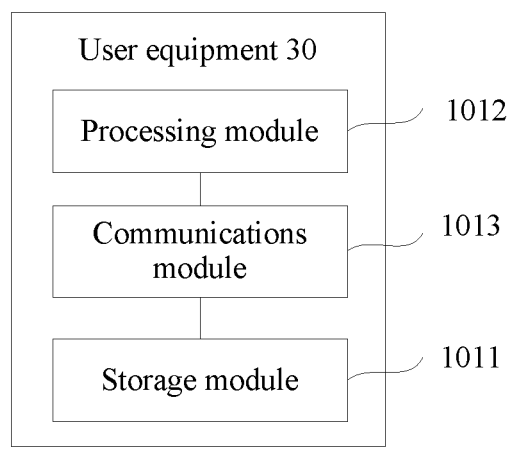
FIG. 22 is a third schematic structural diagram of user equipment according to an embodiment of the present invention.

When an integrated unit is used, FIG. 22 is a schematic diagram of a possible logical structure of the user equipment 30 used in the foregoing embodiment. The user equipment 30 includes a processing module 1012 and a communications module 1013. The processing module 1012 is configured to control and manage an action of the user equipment 30. For example, the processing module 1012 is configured to support the user equipment 30 in performing all steps that are performed by UE in FIG. 8 to FIG. 11A and FIG. 11B, and/or is configured to perform another process of the technology described in this specification. The communications module 1013 is configured to support the user equipment 30 in communicating with an AMF entity. The user equipment 30 may further include a storage module 1011, configured to store program code and data of the user equipment 30.

The processing module 1012 may be a processor or a controller, for example, may be a central processing unit, a general purpose processor, a digital signal processor, an application-specific integrated circuit, a field programmable gate array or another programmable logical device, a transistor logical device, a hardware component, or any combination thereof. The controller/processor may implement or execute various example logical blocks, modules, and circuits described with reference to content disclosed in the present invention. Alternatively, the processor may be a combination that implements a computing function, for example, a combination including one or more microprocessors, or a combination of a digital signal processor and a microprocessor. The communications module 1013 may be a transceiver, a transceiver circuit, a transceiver, or the like. The storage module 1011 may be a memory.

When the processing module 1012 is a processor, the communications module 1013 is a transceiver, and the storage module 1011 is a memory, the user equipment used in this embodiment of the present invention may be a device shown in FIG. 7.

Figure 23:
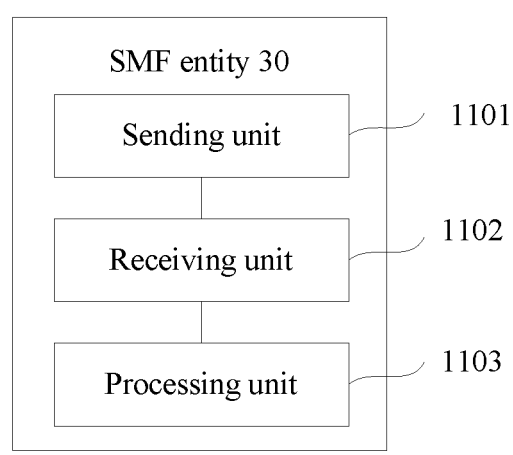
FIG. 23 is a third schematic structural diagram of an SMF entity according to an embodiment of the present invention.

FIG. 23 is a possible schematic structural diagram of an SMF entity used in the foregoing embodiment. An SMF entity 20 includes a sending unit 1101, a receiving unit 1102, and a processing unit 1103. The sending unit 1101 is configured to support user equipment in performing steps S201, S207, and S212 in the foregoing embodiment. The receiving unit 1102 is configured to support the SMF entity in performing S205 and S213 in the foregoing embodiment. The processing unit 1103 is configured to support the SMF entity in performing S206 in the foregoing embodiment. All related content of each step in the foregoing method embodiment may be cited in function descriptions of a corresponding function module, and details are not described herein.

Specifically, in hardware implementation, the sending unit 1101 may be a transmitter of the SMF entity, the receiving unit 1102 may be a receiver of the SMF entity. The receiver and the transmitter may be integrated to constitute a transceiver of the SMF entity 20, as shown in FIG. 6. The processing unit 1103 may be integrated into a processor of the SMF entity 20.

When an integrated unit is used, the SMF entity 20 shown in FIG. 23 may use the logical structure shown in FIG. 19. Specifically, the processing module 712 shown in FIG. 19 is configured to control and manage an action of the SMF entity 20. For example, the processing module 712 is configured to support the SMF entity 20 in performing steps that are performed by an SMF entity in the embodiment shown in FIG. 12A, FIG. 12B, and FIG. 12C to FIG. 15A, FIG. 15B, and FIG. 15C, and/or is configured to perform another process of the technology described in this specification. The communications module 713 is configured to support the SMF entity 20 in communicating with an AMF entity. The SMF entity 20 may further include a storage module 711, configured to store program code and data of the SMF entity 20.

In an aspect, an embodiment of the present invention provides a computer readable storage medium, and the computer readable storage medium stores an instruction. When the computer readable storage medium runs on an SMF entity, the SMF entity performs steps that are performed by an SMF entity in the foregoing embodiments (including all steps performed by an SMF entity in FIG. 8 to FIG. 11A and FIG. 11B, and all steps performed by an SMF entity in FIG. 12A, FIG. 12B, and FIG. 12C to FIG. 15A, FIG. 15B, and FIG. 15C).

In another aspect, an embodiment of the present invention provides a computer readable storage medium, and the computer readable storage medium stores an instruction. When the computer readable storage medium runs on an AMF entity, the AMF entity performs steps that are performed by an AMF entity in the foregoing embodiments (including all steps performed by an AMF entity in FIG. 8 to FIG. 11A and FIG. 11B, and all steps performed by an AMF entity in FIG. 12A, FIG. 12B, and FIG. 12C to FIG. 15A, FIG. 15B, and FIG. 15C).

In still another aspect, an embodiment of the present invention provides a computer readable storage medium, and the computer readable storage medium stores an instruction. When the computer readable storage medium runs on user equipment, the user equipment performs steps that are performed by UE in the foregoing embodiments (including all steps performed by UE in FIG. 8 to FIG. 11A and FIG. 11B, and all steps performed by a UE entity in FIG. 12A, FIG. 12B, and FIG. 12C to FIG. 15A, FIG. 15B, and FIG. 15C).

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer usable storage media (including but not limited to a disk memory, a CD-ROM, an optical memory, and the like) that include computer usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of this application. This application is intended to cover these modifications and variations provided that they fall within the scope of protection defined by the following claims and their equivalent technologies.

The invention claimed is:

1. A session management method, comprising:
receiving, by a session management function entity, a first message from an access and mobility management function entity, wherein the first message carries location information of a user equipment (UE);
determining, by the session management function entity based on the first message, that the UE moves out of a service area of a first user plane function (UPF) entity corresponding to a first protocol data unit session; and
sending, by the session management function entity, an identifier of the first PDU session and a first indication to the UE, wherein the first indication indicates the UE to re-establish the first PDU session, and wherein a data network to which a second protocol data unit session is established is a data network to which the first protocol data unit session was established.

2. The session management method of claim 1, wherein a service continuity mode of the first protocol data unit session is a first session and service continuity (SSC) mode.

3. The session management method of claim 2, further comprising releasing, by the session management function entity, the first protocol data unit session before establishing, by the session management function entity, the second protocol data unit session when the service continuity mode is the first SSC mode.

4. The session management method of claim 1, wherein the UE is in an idle state.

5. The session management method of claim 1, wherein the UE is in a connected state.

6. The session management method of claim 5, wherein a user plane connection between the UE and the first UPF entity does not exist.

7. The session management method of claim 1, further comprising:
selecting a second UPF entity to establish the second protocol data unit session for the UE; and
establishing the second protocol data unit session between the UE and the second UPF entity.

8. The session management method of claim 1, wherein the first UPF entity is an anchor UPF entity that serves the first protocol data unit session.

9. The session management method of claim 1, wherein the session management function entity sends the identifier of the first protocol data unit session and the first indication within N1 session management (SM) information.

10. A session management function entity, comprising:
a processor; and
a memory coupled to the processor and configured to store instructions executable by the processor to cause the session management function entity to:
receive a first message from an access and mobility management function entity, wherein the first message carries location information of a user equipment (UE);
determine that the UE moves out of a service area of a first user plane function (UPF) entity corresponding to a first protocol data unit session; and
send an identifier of the first protocol data unit session and a first indication to the UE, wherein the first indication indicates the UE to re-establish the first protocol data unit session, and wherein a data network to which a second protocol data unit session is established is a same data network to which the first protocol data unit session was established.

11. The session management function entity of claim 10, wherein a service continuity mode of the first protocol data unit session is a first session and service continuity (SSC) mode.

12. The session management function entity of claim 11, wherein the session management function entity releases the first protocol data unit session before the session management function entity establishes the second protocol data unit session when the service continuity mode is the first SSC mode.

13. The session management function entity of claim 10, wherein the UE is in an idle state.

14. The session management function entity of claim 10, wherein the UE is in a connected state.

15. The session management function entity of claim 14, wherein a user plane connection between the UE and the first UPF entity does not exist.

16. The session management function entity of claim 10, wherein the instructions further cause the session management function entity to:
select a second UPF entity to establish the second protocol data unit session for the UE; and
establish the second protocol data unit session between the UE and the second UPF entity.

17. The session management function entity of claim 10, wherein the first UPF entity is an anchor UPF entity that serves the first protocol data unit session.

18. The session management function entity of claim 10, wherein the instructions further cause the session management function entity to send the identifier and the first indication within N1 session management (SM) information.

19. The session management method of claim 1, wherein the first message is sent by the access and mobility management function entity after the access and mobility management function entity receives a service request message, and wherein the service request message carries the identifier of the first protocol data unit session that needs to be activated.

20. The session management function entity of claim 10, wherein the first message is sent by the access and mobility management function entity after the access and mobility management function entity receives a service request message, and wherein the service request message carries the identifier of the first protocol data unit session that needs to be activated.

21. A session management method, comprising:
sending a service request message to an access and mobility management function entity, wherein the service request message comprises an identifier of a first protocol data unit session that needs to be activated; and
receiving, after a user equipment (UE) moves out of a service area of a first user plane function entity corresponding to the first protocol data unit session, the identifier of the first protocol data unit session and first indication from a session management function entity, wherein the first indication indicates the UE to re-establish the first protocol data unit session.

22. The session management method of claim 21, wherein a service continuity mode of the first protocol data unit session is a first session and service continuity (SSC) mode, and the first SSC mode comprises releasing the first protocol data unit session before establishing a second protocol data unit session.

23. The session management method of claim 22, further comprising:
establishing the second protocol data unit session between the UE and a second user plane function entity.

24. The session management method of claim 23, wherein a data network to which the second protocol data unit session is established is a data network to which the first protocol data unit session was established.

25. The session management method of claim 21, wherein the first protocol data unit session is in an inactive state.

26. The session management method of claim 21, wherein the identifier of the first protocol data unit session and the first indication is received within N1 session management (SM) information.

27. An apparatus, comprising:
a processor; and
a memory coupled to the processor and configured to store instructions executable by the processor to cause the apparatus to:
send a service request message to an access and mobility management function entity, wherein the service request message comprises an identifier of a first protocol data unit session that needs to be activated; and
receive, after the apparatus moves out of a service area of a first user plane function entity corresponding to the first protocol data unit session, the identifier of the first protocol data unit session and first indication from a session management function entity, wherein the first indication indicates the apparatus to re-establish the first protocol data unit session.

28. The apparatus of claim 27, wherein a service continuity mode of the first protocol data unit session is a first session and service continuity (SSC) mode, and wherein the first SSC mode comprises releasing the first protocol data unit session before establishing a second protocol data unit session.

29. The apparatus of claim 28, wherein the instructions further cause the UE to:
establish the second protocol data unit session between the UE and a second user plane function entity.

30. The apparatus of claim 29, wherein a data network to which the second protocol data unit session is established is a data network to which the first protocol data unit session was established.

31. The apparatus of claim 27, wherein the first protocol data unit session is in an inactive state.

32. The apparatus of claim 27, wherein the identifier of the first protocol data unit session and the first indication is received within N1 session management (SM) information.

* * * * *

UNITED STATES PATENT AND TRADEMARK OFFICE
CERTIFICATE OF CORRECTION

PATENT NO. : 11,805,559 B2
APPLICATION NO. : 17/527914
DATED : October 31, 2023
INVENTOR(S) : Fenghui Dou et al.

It is certified that error appears in the above-identified patent and that said Letters Patent is hereby corrected as shown below:

In the Claims

Claim 1, Column 37, Line 40: "first PDU session" should read "first protocol data unit session"

Claim 1, Column 37, Line 42: "first PDU session," should read "first protocol data unit session,"

Signed and Sealed this
Nineteenth Day of December, 2023

*Katherine Kelly Vidal*

Katherine Kelly Vidal
*Director of the United States Patent and Trademark Office*